United States Patent
Lin et al.

(10) Patent No.: US 12,499,315 B2
(45) Date of Patent: Dec. 16, 2025

(54) METHOD, APPARATUS, DEVICE AND STORAGE MEDIUM FOR INFORMATION PROCESSING

(71) Applicant: NEC CORPORATION, Tokyo (JP)

(72) Inventors: Adi Lin, Beijing (CN); Lu Feng, Beijing (CN)

(73) Assignee: NEC CORPORATION, Tokyo (JP)

( * ) Notice: Subject to any disclaimer, the term of this patent is extended or adjusted under 35 U.S.C. 154(b) by 244 days.

(21) Appl. No.: 18/355,250

(22) Filed: Jul. 19, 2023

(65) Prior Publication Data
US 2024/0028836 A1 Jan. 25, 2024

(30) Foreign Application Priority Data

Jul. 20, 2022 (CN) .......................... 202210861703.8
Jul. 20, 2022 (CN) .......................... 202210861704.2
Jul. 20, 2022 (CN) .......................... 202210864179.X

(51) Int. Cl.
*G06F 17/00* (2019.01)
*G06F 40/289* (2020.01)
*G06F 40/30* (2020.01)

(52) U.S. Cl.
CPC ............ *G06F 40/30* (2020.01); *G06F 40/289* (2020.01)

(58) Field of Classification Search
None
See application file for complete search history.

(56) References Cited

U.S. PATENT DOCUMENTS

| | | | |
|---|---|---|---|
| 9,690,772 B2* | 6/2017 | Brun | G06F 18/2431 |
| 10,972,921 B2 | 4/2021 | Singh Bawa et al. | |
| 11,126,793 B2* | 9/2021 | Gkotsoulia | G06F 40/163 |
| 11,182,410 B2* | 11/2021 | Keskar | G06F 16/334 |
| 2003/0004716 A1* | 1/2003 | Haigh | G10L 15/10 |
| | | | 704/238 |

(Continued)

FOREIGN PATENT DOCUMENTS

| | | |
|---|---|---|
| AU | 2020202979 A1 | 5/2020 |
| CN | 112352235 A | 2/2021 |

(Continued)

OTHER PUBLICATIONS

Yuta Kanahyo, et al ."Automatic Construction of Evaluation Axes for Each Genre using Product Reviews on Online Shopping Sites", The Institute of Electronics, Information and Communication Engineers, Technical Committee on Data Engineering Research, Mar. 2, 2016 (9 pages).

(Continued)

*Primary Examiner* — Satwant K Singh
(74) *Attorney, Agent, or Firm* — Sughrue Mion, PLLC

(57) ABSTRACT

According to the embodiments of the present disclosure, a method, apparatus, device, and storage media for information processing are provided. The method comprises extracting a plurality of keywords from an unstructured text set for a target object. The method comprises grouping at least a portion of the plurality of keywords based on semantics of the plurality of keywords. The method further comprises determining a target factor corresponding to a group of keywords based on a result of the grouping. The target factor represents an aspect of the target object. As such, new factors that affect the target object can be identified.

18 Claims, 14 Drawing Sheets

(56) References Cited

U.S. PATENT DOCUMENTS

| | | | | |
|---|---|---|---|---|
| 2016/0239500 A1* | 8/2016 | Dave | .................. | G06F 16/355 |
| 2019/0260694 A1* | 8/2019 | Londhe | ................ | H04L 51/216 |
| 2020/0242299 A1* | 7/2020 | Ekmekci | ............... | G06F 40/30 |
| 2021/0103634 A1* | 4/2021 | Gkikas | ................ | G06F 40/211 |
| 2022/0067287 A1* | 3/2022 | Cobb | .................. | G06F 40/205 |
| 2022/0253942 A1* | 8/2022 | Wang | ................. | G06F 40/284 |

FOREIGN PATENT DOCUMENTS

| | | |
|---|---|---|
| CN | 112926311 A | 6/2021 |
| CN | 113010572 A | 6/2021 |

OTHER PUBLICATIONS

Japanese Office Action dated Dec. 3, 2024 in Application No. 2023-118434.

Roy Bar-Haim, et al., "Every Bite is an Experience: Key Point Analysis of Business Reviews", Proceedings of the 59th Annual Meeting of the Association for Computational Linguistics and the 11th International Joint Conference on Natural Language Processing, Aug. 1-6, 2021, pp. 3376-3386 (11 pages total).

Michael Conklin, et al., "Customer satisfaction analysis: Identification of key drivers", European Journal of Operational Research, 2004, vol. 154, pp. 819-827 (10 pages total).

Joachim Büschken, et al., "The Dimensionality of Customer Satisfaction Survey Responses and Implications for Driver Analysis". Marketing Science, Jul.-Aug. 2013, vol. 32, No. 4, pp. 533-553 (22 pages total).

* cited by examiner

Rate the comfort of the seat — 210-1
☐ 5  ☐ 4  ☐ 3  ☐ 2  ☐ 1

Rate the cabin service — 210-2
☐ 5  ☐ 4  ☐ 3  ☐ 2  ☐ 1

Rate the food and beverage — 210-3
☐ 5  ☐ 4  ☐ 3  ☐ 2  ☐ 1

Rate the entertainment — 210-4
☐ 5  ☐ 4  ☐ 3  ☐ 2  ☐ 1

Rate the ground service — 210-5
☐ 5  ☐ 4  ☐ 3  ☐ 2  ☐ 1

Rate value for money — 210-6
☐ 5  ☐ 4  ☐ 3  ☐ 2  ☐ 1

Rate your overall experience — 220
☐ 10  ☐ 9  ☐ 8  ☐ 7  ☐ 6
☐ 5  ☐ 4  ☐ 3  ☐ 2  ☐ 1

Any comment or suggestion? — 230

| overall | seat comfort | cabin service | food and beverage | entertainment | ground service | value for money | customer review |
|---|---|---|---|---|---|---|---|
| 7 | 4 | 5 | 4 | 4 | 2 | 4 | First time I'd flown |
| 2 | 4 | 1 | 1 | 1 | 1 | 1 | We make our check |
| 3 | 1 | 4 | 1 | 3 | 1 | 2 | I flew with this cor |
| 10 | 4 | 5 | 5 | 5 | 5 | 5 | Turkish Airline has |
| 2 | 3 | 3 | 5 | 3 | 1 | 1 | Delays on each flight |

| TARGET FACTOR | TARGET SENTENCE | SENTIMENT | FREQUENCY |
|---|---|---|---|
| leg room | I have never seen a more spacious plane with such leg room in economy class | Positive | 500 |
| | The leg room was horrible | Negative | 800 |

| overall | seat comfort | cabin service | food and beverage | entertainment | ground service | value for money | customer review | leg room | food and beverage |
|---|---|---|---|---|---|---|---|---|---|
| 7 | 4 | 5 | 4 | 4 | 2 | 4 | First time I'd flown | 1 | 2 |
| 2 | 4 | 1 | 1 | 1 | 1 | 1 | We make our che | 1 | 3 |
| 3 | 1 | 4 | 1 | 3 | 1 | 2 | I flew with this cor | 0 | 1 |
| 10 | 4 | 5 | 5 | 5 | 5 | 5 | Turkish Airline has | 3 | 0 |
| 2 | 3 | 3 | 5 | 3 | 1 | 1 | Delays on each fl | 2 | 2 |

*FIG. 6A*

| overall | seat comfort | cabin service | food and beverage | entertainment | ground service | value for money | customer review | leg room |
|---|---|---|---|---|---|---|---|---|
| 7 | 4 | 5 | 4 | 4 | 2 | 4 | First time I'd flown | 5 |
| 2 | 4 | 1 | 1 | 1 | 1 | 1 | We make our check | 3 |
| 3 | 1 | 4 | 1 | 3 | 1 | 2 | I flew with this cor | 0 |
| 10 | 4 | 5 | 5 | 5 | 5 | 5 | Turkish Airline has | 4 |
| 2 | 3 | 3 | 5 | 3 | 1 | 1 | Delays on each flight | 3 |

| Rate the comfort of the seat | | | | | 210-1 |
| ☐ 5 | ☐ 4 | ☐ 3 | ☐ 2 | ☐ 1 | |

| Rate the cabin service | | | | | 210-2 |
| ☐ 5 | ☐ 4 | ☐ 3 | ☐ 2 | ☐ 1 | |

| Rate the food and beverage | | | | | 210-3 |
| ☐ 5 | ☐ 4 | ☐ 3 | ☐ 2 | ☐ 1 | |

| Rate the ground service | | | | | 210-5 |
| ☐ 5 | ☐ 4 | ☐ 3 | ☐ 2 | ☐ 1 | |

| Rate value for money | | | | | 210-6 |
| ☐ 5 | ☐ 4 | ☐ 3 | ☐ 2 | ☐ 1 | |

| Rate the price | | | | | 1010 |
| ☐ 5 | ☐ 4 | ☐ 3 | ☐ 2 | ☐ 1 | |

Rate your overall experience — 220
☐ 10  ☐ 9  ☐ 8  ☐ 7  ☐ 6
☐ 5  ☐ 4  ☐ 3  ☐ 2  ☐ 1

Any comment or suggestion? — 230

FIG. 10

METHOD, APPARATUS, DEVICE AND STORAGE MEDIUM FOR INFORMATION PROCESSING

CROSS REFERENCE TO RELATED APPLICATIONS

The present application claims priority to Chinese Patent Application No. 202210864179.X, entitled "METHOD, APPARATUS, DEVICE AND STORAGE MEDIUM FOR INFORMATION PROCESSING," filed on Jul. 20, 2022; Chinese Patent Application No. 202210861703.8, entitled "METHOD, APPARATUS, DEVICE AND STORAGE MEDIUM FOR INFORMATION PROCESSING," filed on Jul. 20, 2022; and Chinese Patent Application No. 202210861704.2, entitled "METHOD, APPARATUS, DEVICE AND STORAGE MEDIUM FOR INFORMATION PROCESSING," filed on Jul. 20, 2022, the contents of which are hereby incorporated by reference in its entirety.

TECHNICAL FIELD

The example embodiments in the present disclosure relates to the field of the field of computers, and in particular to a method, an apparatus, a device and a storage medium for information processing.

BACKGROUND

Through unstructured text, people can provide comments on an object (such as a product, service, and so on). For example, user comments are often displayed on product purchase pages or service display pages. For another example, a questionnaire can include open-ended questions for respondents to provide textual comments. Such unstructured text typically contains rich information about the described object. It is desired to interpret and utilize such information.

SUMMARY

In the first aspect of the present disclosure, a method of information processing is provided. This method includes: extracting a plurality of keywords from an unstructured text set for a target object; grouping at least a portion of the plurality of keywords based on semantics of the plurality of keywords; and determining a target factor corresponding to a group of keywords based on a result of the grouping, the target factor representing an aspect of the target object.

In the second aspect of the present disclosure, an electronic device is provided. The electronic device includes at least one processing circuit configured to: extract a plurality of keywords from an unstructured text set for a target object; group at least a portion of the plurality of keywords based on semantics of the plurality of keywords; and determine a target factor corresponding to a group of keywords based on a result of the grouping, the target factor representing an aspect of the target object.

In a third aspect of the present disclosure, an electronic device is provided. The device includes at least one processing unit; and at least one memory, coupled to the at least one processing unit and storing instructions for execution by the at least one processing unit, which causes the device to implement the method of the first aspect when executed by the at least one processing unit.

In a fourth aspect of the present disclosure, a computer readable storage medium is provided. The computer readable storage medium stores a computer program, which can be executed by a processor to implement the method of the first aspect.

In a fifth aspect of the present disclosure, a method of information processing is provided. The method includes: acquiring a group of target factors of a target object, the group of target factors being determined based on an unstructured text set about the target object, and each target factor representing an aspect of the target object; and determining, based on the group of target factors and a group of structured factors of the target object, at least one target factor for the target object, wherein the at least one target factor of the group of target factors is different from the group of structured factors.

In a sixth aspect of the present disclosure, an electronic device is provided. The electronic device includes at least one processing circuit. The at least one processing circuit is configured to acquire a group of target factors of a target object, the group of target factors being determined based on an unstructured text set about the target object, and each target factor representing an aspect of the target object; and determine, based on the group of target factors and a group of structured factors of the target object, at least one target factor for the target object, wherein the at least one target factor of the group of target factors is different from the group of structured factors.

In a seventh aspect of the present disclosure, an electronic device is provided. The device includes at least one processing unit; and at least one memory, coupled to the at least one processing unit and storing instructions for execution by the at least one processing unit, which causes the device to implement the method of the fifth aspect when executed by the at least one processing unit.

In an eighth aspect of the present disclosure, a computer readable storage medium is provided. The computer readable storage medium stores a computer program, which can be executed by a processor to implement the method of the fifth aspect.

In a ninth aspect of the present disclosure, a method of information processing is provided. The method includes: acquiring a group of target factors of a target object, the group of target factors being determined based on an unstructured text set about the target object, and each target factor representing an aspect of the target object; and presenting an information collection form for collecting a description of the target object, wherein the at least one target factor is determined from a group of structured factors and a group of target factors from the target object.

In a tenth aspect of the present disclosure, an electronic device is provided. The electronic device includes at least one processing circuit. The at least one processing circuit is configured to acquire a group of target factors of a target object, the group of target factors being determined based on an unstructured text set about the target object, and each target factor representing an aspect of the target object; and present an information collection form for collecting a description of the target object, wherein the at least one target factor is determined from a group of structured factors and a group of target factors from the target object.

In an eleventh aspect of the present disclosure, an electronic device is provided. The device includes at least one processing unit; and at least one memory, coupled to the at least one processing unit and storing instructions for execution by the at least one processing unit, which causes the device to implement the method of the seventh aspect when executed by the at least one processing unit.

In a twelfth aspect of the present disclosure, a computer readable storage medium is provided. The computer readable storage medium stores a computer program, which can be executed by a processor to implement the method of the ninth aspect.

It should be understood that the content described in the content section of the present invention is not intended to limit the key or important features of the embodiments of the present disclosure, nor is it used to limit the scope of the present disclosure. The other features disclosed in the present disclosure will become easier to understand through the following description.

BRIEF DESCRIPTION OF DRAWINGS

The above and other features, advantages, and aspects of each embodiment of the present disclosure will become more apparent in conjunction with the accompanying drawings and with reference to the following detailed explanations. In the accompanying drawings, the same or similar reference numerals represent the same or similar elements, where:

FIG. 2 illustrates an example of an information collection form according to some embodiments of the present disclosure;

FIG. 5 illustrates a schematic diagram of information related to a target factor according to some embodiments of the present disclosure;

FIG. 6A illustrates an example of a metric for target factors according to some embodiments of the present disclosure;

FIG. 6B illustrates another example of a metric for target factors according to some embodiments of the present disclosure;

FIG. 10 illustrates a schematic diagram of an updated version of an information collection form according to some embodiments of the present disclosure;

DETAILED DESCRIPTIONS

Figure 1:
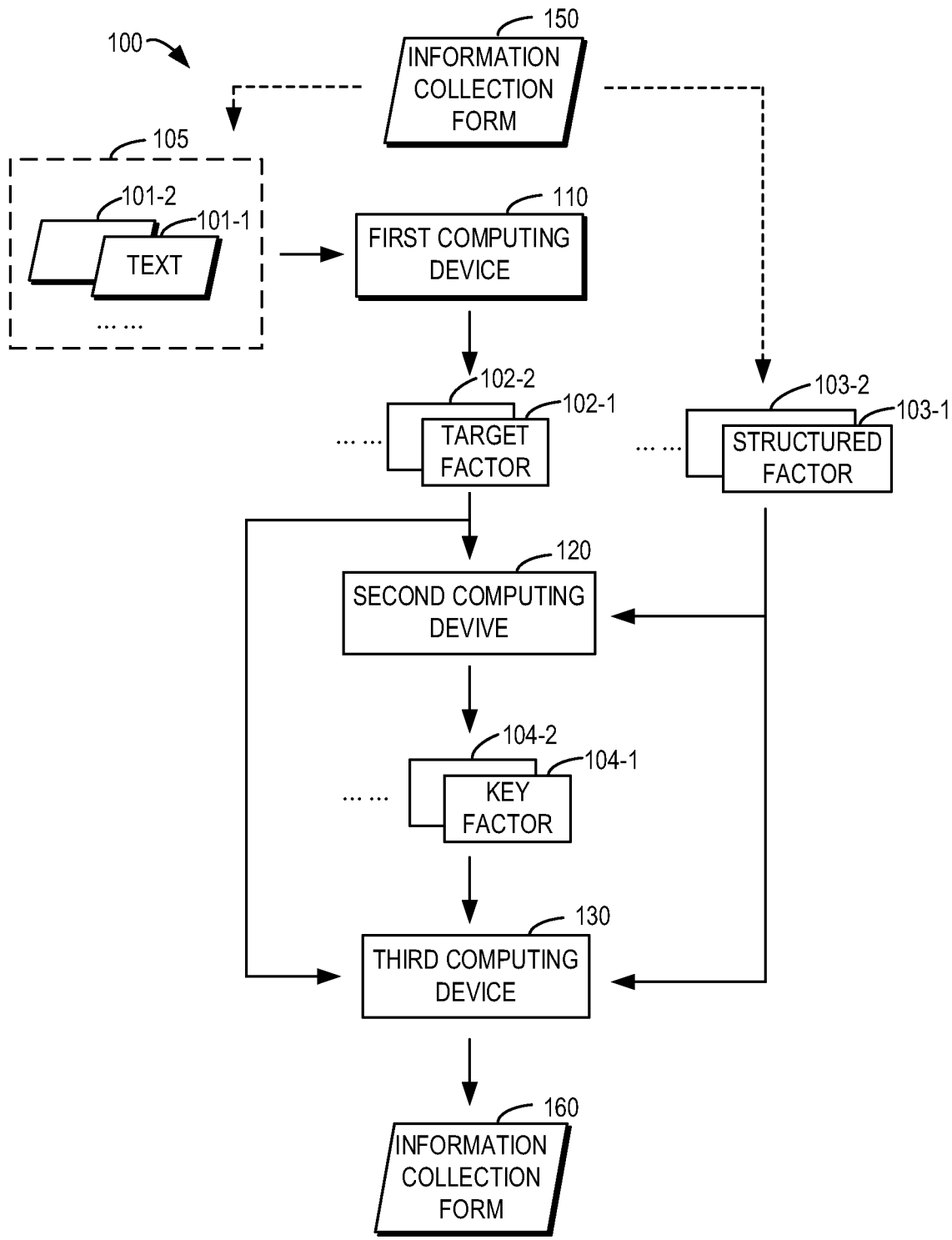
FIG. 1 illustrates a schematic diagram of an example environment in which the embodiments of the present disclosure can be implemented.

The embodiments of the present disclosure will be described in more detail below with reference to the accompanying drawings. Although certain embodiments of the present disclosure are shown in the accompanying drawings, it should be understood that the present disclosure can be implemented in various forms and should not be limited to the embodiments described here. On the contrary, these embodiments are provided for a more thorough and complete understanding of the present disclosure. It should be understood that the accompanying drawings and embodiments of the present disclosure are only for illustrative purposes and are not intended to limit the scope of protection of the present disclosure.

In the description of the embodiments of the present disclosure, the term "including" and similar terms should be understood as open inclusion, that is, "including but not limited to". The term "based on" should be understood as "at least partially based on" The term "one embodiment" or "the embodiment" should be understood as "at least one embodiment". The term "some embodiments" should be understood as "at least some embodiments". The following text may also include other explicit and implicit definitions.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the term "model" may learn a correlation between corresponding inputs and outputs from training data, so that after training is completed, a corresponding output can be generated for a given input. The generation of a model may be based on machine learning technology. Deep learning is a machine learning algorithm that uses multiple layers of processing units to process inputs and provide corresponding outputs. In this article, a "model" may also be referred to as a "machine learning model", a "machine learning network", or a "network", and these terms are used interchangeably herein. A model may also include different types of processing units or networks.

As briefly mentioned above, unstructured text about an object contains rich information about the object. It is expected to be able to interpret and utilize such information. In traditional solutions, an object is described using a manually specified sentence or a sentence extracted from text. These traditional approaches cannot extract factors for the object, nor can it quantify a degree of concern for these factors. Therefore, traditional solutions have limited interpretation of unstructured text and do not provide information that may be further utilized.

The embodiments of the present disclosure propose a solution for information processing. In one aspect of the present disclosure, keywords are extracted from a text set about a target object, and a group of target factors for the target object is determined based on a grouping of the extracted keywords. Each target factor represents an aspect of the target object. Through extracting a target factor from unstructured text, a new factor that affect the target object may be discovered.

In another aspect of the present disclosure, at least one key factor of a target object is determined from a group of target factors and a group of structured factors for the target object. At least one target factor is different from a structured factor. Through considering both an existing structured factor and a newly extracted target factor, a determined key factor is more accurate. This helps to understand a key aspect of the target object, thereby promoting optimization for the target object.

In another aspect of the present disclosure, an information collection form for collecting a description of the target object is presented based on at least one determined key factor. In this way, the design of the information collection form is optimized to collect evaluation information about the target object more effectively.

Sample Environment

FIG. 1 illustrates a schematic diagram of an example environment 100 that can be implemented in the embodiments of the present disclosure. In the environment 100, a first computing device 110 receives a text set 105 about the target object, or the first computing device 110 extracts the text set 105 from the original data. The text set 105 includes text 101-1, 101-2, . . . , and it is also collectively or individually referred to as text 101. The target object may include any tangible object, intangible object, and their combination. For example, the target object may be a product, such as a household good, food, and so on. For another example, the target object may be a service, such as a cloud computing service, a cloud storage service, and so on. For example, the target object may be an entity providing services and goods such as a flight, a restaurant, a hotel, and so on.

The text 101 may be a description of the target object by a user of the target object. The text 101 may include a sentence with sentiment, for example "apple is good" or "apple tastes bad". The text 101 may also include a sentence with no sentiment, for example "I ate an apple". The text 101 may be evaluation, comments, reviews, assessment, suggestions, feelings, and so on, for the target object. The text 101 contains information about the factors that affect the target object. Each text 101 in the text set 105 may be provided by different users or by a same user at different times.

In some embodiments, the text 101 may be user evaluation on a display page of the target object. The display page may be derived from a shopping app (APP), a service providing APP, a review APP, and so on.

In some embodiments, the text 101 may be derived from an information collection form 150 for the target object, as shown in FIG. 1. As used herein, the "information collection form" is used to collect a description of the target object (for example, evaluation, a feeling, and so on), and for example may be used as an electronic questionnaire, a review, and so on. The information collection form 150 includes an open-ended question about the target object. The text 101 may be a user's response to an open-ended question.

FIG. 2 illustrates an example of the information collection form 150. In this example, the information collection form 150 for a certain flight includes an open-ended question 230. A user may provide feedback to the flight through text boxes. A response set 250 of the information collection form 150 is shown in a form of table. Each row in the response set 250 represents a response record from a same user. In each response record, a column 258 is a response to the open-ended question 230. The text 101 may be the text in the column 258.

Continuing with reference to FIG. 1, the first computing device 110, based on the text set 105, determines target factors 102-1, 102-2, . . . of the target object which is also collectively referred to as a group of target factors 102 or individually as a target factor 102. Such a target factor 102 is determined from unstructured text and is therefore also known as an "extracted factor" or an "unstructured factor".

The group of target factors 102 is provided to a second computing device 120. The second computing device 120 also receives or determines structured factors 103-1, 103-2, . . . of the target object which is also collectively referred to as a group of structured factors 103 or individually as a structured factor 103. As used herein, the term "structured factor" refers to a factor that has a predetermined option (for example, a predetermined value, a category, a star rating, and so on) in a criterion. For the structured factor, a user may choose an option from the predetermined options to evaluate or describe the target object from a perspective of the structured factor. The structured factor is quantitative and highly organized. The description for the structured factor (for example, evaluation, assessment) is not open-ended, but needs to conform to an architecture with predetermined options.

The structured factor may also include a numerical factor or a categorical factor. The predetermined options for the numerical factor include predetermined values or predetermined star ratings. The predetermined options for the categorical factor include predetermined categories, such as categories of a cabin. In this article, the target factor and the structured factor are also collectively or individually referred to as a "factor".

In some embodiments, the group of structured factors 103 may come from the information collection form 150, as shown in FIG. 1. The information collection form 150 may include a closed-ended question about the structured factor 103. The closed-ended question refers to a question with an answer which is selected from predetermined options. In the example in FIG. 2, the information collection form 150 includes a closed-ended question 210-1 regarding the structured factor "seat comfort", a closed-ended question 210-2 regarding the structured factor "cabin service", a closed-ended question 210-3 regarding the structured factor "food and beverage", and a closed-ended question 210-4 regarding the structured factor "entertainment", a closed-ended question 210-5 regarding the structured factor "ground service" and a closed-ended question 210-6 regarding the structured factor "value for money". The closed-ended questions 210-1 to 210-6 are also collectively or individually referred to as a closed-ended question 210. Each closed-ended question 210 has 5 scores for a user to choose from. In the response set 250, columns 252-257 represent user responses to the closed-ended questions 210-1 to 210-6, respectively.

Reference is made back to FIG. 1. The second computing device 120 determines at least one key factor 104-1, 104-2, . . . of the target object from the group of target factors 102 and the group of structured factors 103, which are also collectively or individually referred to as a key factor 104. As used herein, the term "key factor" refers to a factor that has an impact on the target object. The impact on the target object may include the impact on performance, services, functionality, overall evaluation, or a satisfaction degree for the target object. Specifically, the key factor may be a factor with a high influence degree for the target object among many factors. The influence degree may reflect an importance degree for factors to the target object.

In the example in FIG. 2, the information collection form 150 includes a closed-ended question 220 regarding the overall evaluation of the target object. In the response set 250, a column 251 is the user's response to the closed-ended question 220.

Reference is made back to FIG. 1. A determined key factor 104 is provided to a third computing device 130. The third computing device 130 presents an information collection form 160 for the target object based on the key factor 104. In some embodiments, the information collection form 160 may be generated based on the key factor 104. In some embodiments, the information collection form 160 may be an updated version of the information collection form 150.

In the environment 100, the first computing device 110, the second computing device 120, and the third computing device 130 may be any type of device capable of computing, including a terminal device or a server device. The terminal device may be any type of mobile terminal, fixed terminal or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camera, a positioning device, a television receiver, a radio broadcasting receiver, an e-book device, a gaming device, or any combination thereof, accessories and peripherals of these devices or any combination thereof. For example, the server device may include a computing system/server, such as a mainframe, an edge computing node, a computing device in the cloud environment, and so on.

It should be understood that descriptions of the structure and functionality of the environment 100 is only for illustrative purposes and do not imply any limitations on the scope of the present disclosure. Although the first computing device 110, the second computing device 120, and the third computing device 130 are shown separately in FIG. 1, however in some embodiments, both or all of the first computing device 110, the second computing device 120, and the third computing device 130 may be a same device or belong to a same computing system.

In addition, the information collection form shown in FIG. 2 is only illustrative and is not intended to limit the scope of the present disclosure. The open-ended question, the closed-ended question, and their numbers shown in FIG. 2 are only illustrative. In the embodiments of the present disclosure, the information collection form may have any suitable number of open-ended questions and closed-ended questions. Furthermore, although English is used as an example, the embodiments of the present disclosure may be used to process text and information collection forms in any language.

Extraction of Target Factors

Figure 3:
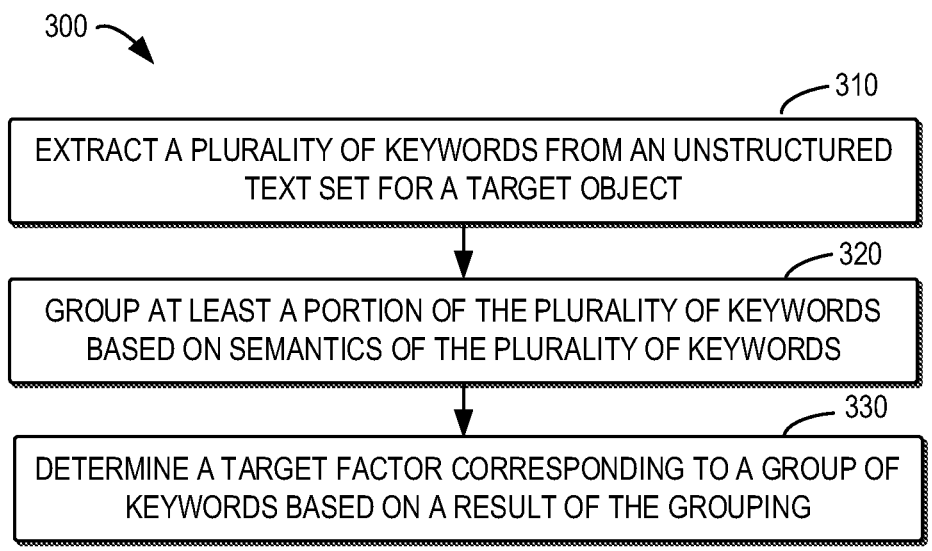
FIG. 3 illustrates a flowchart of a process of determining a target factor according to some embodiments of the present disclosure.

FIG. 3 illustrates a flowchart of a process 300 for determining a target factor according to some embodiments of the present disclosure. The process 300 may be implemented at the first computing device 110. For sake of discussion, the process 300 is described with reference to FIG. 1.

At block 310, the first computing device 110 extracts a plurality of keywords from the unstructured text set 105 for the target object. The extracted keywords may have any suitable number of segments. The keywords may include a one-segment keyword such as "flight", "seat", "service", and so on, and a two-segment keyword such as "cabin crew", "flight attendant", and so on. Any suitable keyword extraction algorithm may be used, for example but not limited to TF-IDF, KP Miner, SBKE, RAKE, TextRank, YAKE, KeyBERT, and so on.

In some embodiments, before applying the keyword extraction algorithm, the text 101 in the text set 105 may be preprocessed, for example named entities and stop words may be removed. For example, a named entity may be a person name, an organization name, a geographical name, and so on, which do not describe any aspect of the target object. For English text, a stop word, for example, may be "a", "an", "the", "and", and so on. For Chinese text, a stop word, for example, may be "a", "one", "and", "but", and so on. Alternatively, in some embodiments, the text 101 may be preprocessed by a keyword extraction algorithm.

In some embodiments, a keyword extraction algorithm may be used to extract nouns as keywords from the text set 105. In this way, words that cannot describe other attributes of an aspect of the target object may be avoided to be extracted, which may effectively reduce the difficulty of subsequent processing.

In some embodiments, the first computing device 110 may extract keywords based on the number of occurrences (that is, word frequency) of each word in the text set 105. Specifically, the first computing device 110 may extract candidate words from the text 101 of the text set 105. If the number of occurrences of a candidate word in the text set 105 exceeds a threshold number, the candidate word is determined as one of the keywords. If the number of occurrences of the candidate word in the text set 105 is less than the threshold number, the candidate word is removed.

For example, a keyword extraction algorithm may be used to extract candidate words from the column 258 of each response record. For each extracted candidate word, the number of occurrences of the extracted candidate word in the entire text set 105 is computed. Candidate words with the number of occurrences exceeding the threshold number are determined as keywords, while candidate words with the number of occurrences less than the threshold number are removed. In this embodiment, by filtering the preliminarily extracted candidate words, the determination of target factors may be avoided to be interfered with unimportant words.

Alternatively, in some embodiments, the first computing device 110 may extract keywords based on semantics of the text 101 in the text set 105. For example, semantic analysis may be used to determine sentences with sentiment, and nouns related to sentiment in such sentences may be used as keywords.

At block 320, the first computing device 110 groups at least a portion of the plurality of keywords based on semantics of the plurality of keywords. In some embodiments, all keywords may be grouped. In some embodiments, keywords may be filtered based on a preliminary result of grouping, and the filtered keywords may be grouped.

The first computing device 110 may use clustering to group a plurality of extracted keywords. To this end, a word vector representing semantics is generated for each keyword. Any suitable method may be used to generate the word vector, for example word2vector, GloVe, and so on. The embodiments of the present disclosure are not limited in this regard.

The plurality of keywords may be clustered based on word vectors to determine a plurality of clusters, where each cluster includes at least one keyword. A clustering algorithm may divide these keywords into independent and non-overlapping clusters based on semantic similarity. Any suitable clustering algorithm may be used, for example K-Means, Density-Based Spatial Clustering of Applications with Noise (DBSCAN), a Gaussian Mixture model, and so on.

In some embodiments, keywords may be filtered based on quality of each cluster. The quality of a cluster represents an aggregation degree in terms of semantics of keywords in the cluster. For example, a sum of square distances of keywords in a cluster may be used as the quality of the cluster. Alternatively, or in addition, the Silhouette coefficient may also be used as the quality of the cluster.

The quality of each cluster obtained by clustering may be determined. In some embodiments, keywords in a cluster with the quality lower than a threshold quality may be removed to determine remaining keywords. The remaining keywords may be grouped based on semantics of the remaining keywords. For example, the remaining keywords may be clustered. The keywords obtained in the same cluster are considered as a group of keywords. Alternatively, in some embodiments, a cluster with the quality lower than a threshold quality may be removed and other clusters with the quality higher than the threshold quality may be retained. For the retained clusters, keywords within the same cluster are considered as a group of keywords. In this embodiment, there is no need to regroup the remaining keywords.

Figure 4:
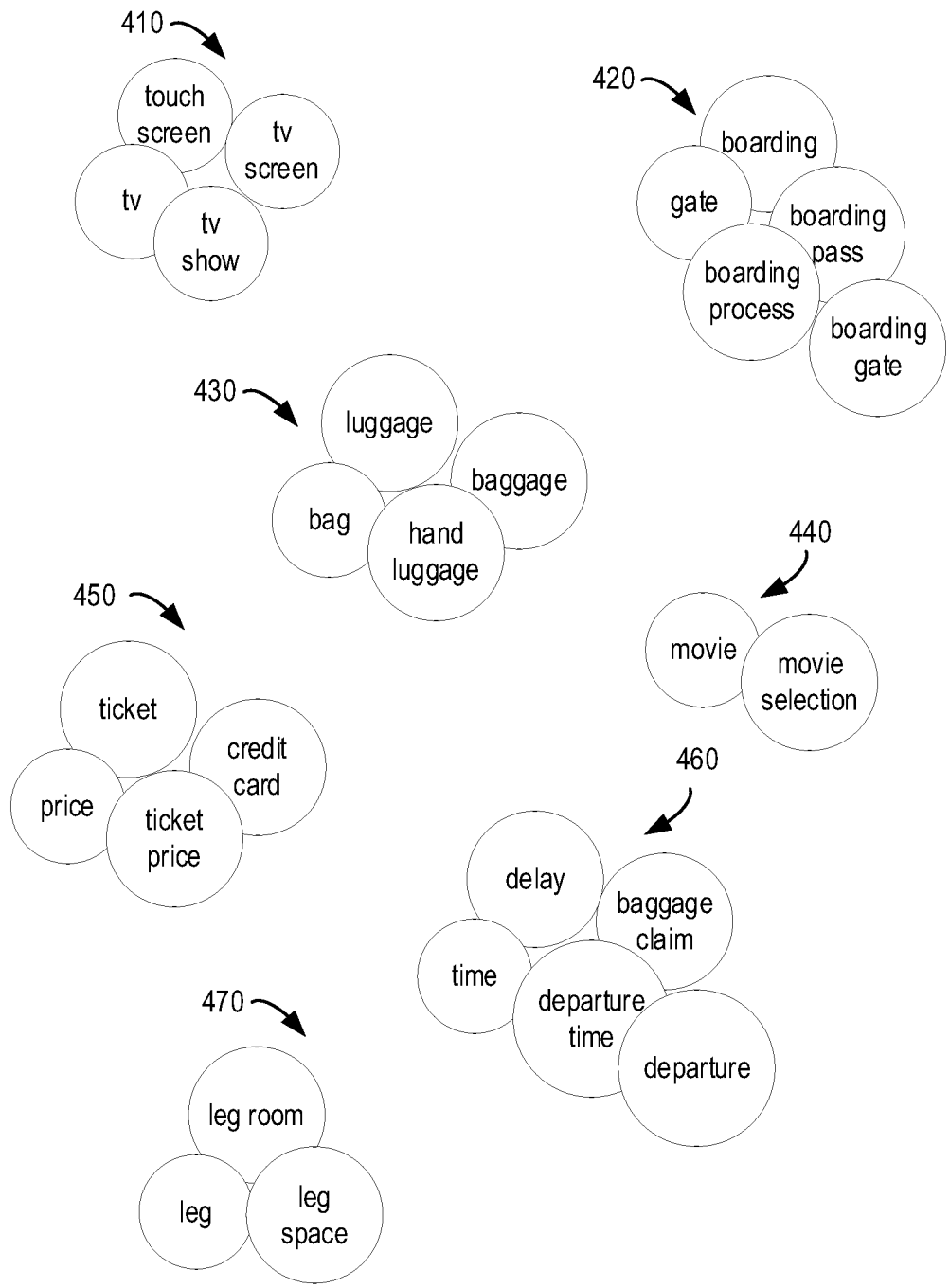
FIG. 4 illustrates a schematic diagram of keyword groupings according to some embodiments of the present disclosure.

FIG. 4 illustrates an example of keyword groupings. The result of grouping may be obtained by processing the text in the column 258 of the response set 250. In FIG. 4, a keyword grouping 410, a keyword grouping 420, a keyword grouping 430, a keyword grouping 440, a keyword grouping 450, a keyword grouping 460, and a keyword grouping 470 are determined through clustering. Each keyword grouping includes one or more keywords.

Continuing with reference to FIG. 3, at block 330, the first computing device 110 determines the target factor 102 corresponding to a group of keywords based on a result of the grouping. The target factor 102 represents an aspect of the target object. The same group of keywords have similar semantics, therefore representing the same aspect of the target object. In this regard, a group of keywords may correspond to the target factor 102.

The name or identification of the target factor 102 corresponding to a group of keywords may be determined based on the group of keywords. As an example, any keyword in the group of keywords may be used to represent a corresponding target factor. As another example, a center of a cluster composed of a group of keywords may be determined, and the corresponding target factor may be represented by the keyword with the closest semantic feature to the center. As another example, the aspect of the target object described by the group of keywords (for example, a service or performance) may be used to represent the target factor.

In the example in FIG. 4, the target factor corresponding to the keyword grouping 410 is "tv service". The target factor corresponding to the keyword grouping 420 is "boarding procedure". The target factor corresponding to the keyword grouping 430 is "luggage service". The target factor corresponding to the keyword grouping 440 is "movie service". The target factor corresponding to the keyword grouping 450 is "price". The target factor corresponding to the keyword grouping 460 is "time". The target factor corresponding to the keyword grouping 470 is "leg room".

In some embodiments, one or more groups of keywords that are the same or similar to structured factors may be removed. In this case, the first computing device 110 determines the target factor corresponding to the group of keywords that have not been removed. For example, for each group of keywords, the first computing device 110 may determine whether the group of keywords are similar to a structured factor of the target object in terms of semantics. If the group of keywords are not similar to any structured factor in terms of semantics, the target factor is determined based on the group of keywords. If the group of keywords are similar to a structured factor in terms of semantics, the group of keywords may be removed.

As an example, by processing the text in the column 258, a group of keywords "food", "meal", "drink", "snack" may be obtained. The group of keywords are similar to a structured factor "food and beverage" in FIG. 2 in terms of semantics. Correspondingly, the group of keywords is removed without the need to determine the corresponding target factor.

Through the above process 300, factors for the target object are extracted from open-ended textual comments or reviews. In this way, the information contained in the unstructured text is analyzed, which helps to discover new factors that affect the target object.

The process 300 may also include an additional block. In some embodiments, the first computing device 110 may determine at least one target sentence corresponding to the target factor 102 based on the text set 105. The target sentence reflects a perspective about the target factor. For example, the target sentence may be a simple and understandable sentence related to the target factor. The target sentence may be used to explain the target factor.

Each target sentence should involve (for example, describe or discuss) the target factor and have clear sentiment. The target sentence may be a sentence that reflects a positive perspective on the target factor. Alternatively, or in addition, the target sentence may be a sentence that reflects a negative perspective on the target factor. Additionally, each target sentence should be a valid and understandable sentence. In some embodiments, the target sentence may only involve the target factor and may not involve other factors of the target object. In this embodiment, the target sentence may explain an individual factor clearly to avoid confusion.

The first computing device 110 may determine the target sentence in any suitable way. For example, one or more sentences related to the target factor may be generated. Whether there is a sentence matching the generated sentence in terms of semantics and the number of matched sentences in the text set 105 are determined. If the number of matched sentences exceeds a threshold number, the generated sentence may be used as the target sentence.

In some embodiments, the first computing device 110 may use a keyword corresponding to the target factor to determine the target sentence. Specifically, the first computing device 110 may extract at least one candidate sentence from the text set 105. Each extracted candidate sentence contains at least one keyword in a group of keywords corresponding to the target factor. For example, a candidate sentence extracted for the target factor "leg room" includes at least one keyword in the keyword grouping 470.

The first computing device 110 may further determine at least one target sentence related to the target factor based on the extracted at least one candidate sentence. For example, the extracted candidate sentence may be directly used as the target sentence. In another example, candidate sentences with the same sentiment may be merged into a target sentence, or a target sentence may be generated based on candidate sentences with the same sentiment.

Depending on the perspective reflected in the text in the text set 105 regarding the target factor, the target sentence may include a sentence reflecting a positive perspective on the target factor, a sentence reflecting a negative perspective on the target factor, or both. That is, the target sentence may include a sentence with positive sentiment, a sentence with negative sentiment, or both.

Table 500 in FIG. 5 illustrates information related to a target factor "leg room". A target sentence 501 about the target factor 'leg room' has positive sentiment, while a target sentence 502 about a target factor 'leg room' has negative sentiment. The information conveyed by presenting the target factor alone is limited or difficult to understand. A target sentence may be used to explain a target factor. Presenting the target sentence together with the target factor may make a relevant party of the target object understanding the target factor more intuitively.

In some embodiments, the first computing device 110 may further determine the number of sentences in the text set 105 that have similar semantics to the target sentence. The number may be used as a frequency of the target sentence. For example, FIG. 5 shows that the frequency of the target sentence 501 is 500, while the frequency of the target sentence 502 is 800. This means that there are more negative perspectives on a target factor "leg room" than positive perspectives. By determining and presenting the frequency of target sentences, advantages and disadvantages of the target object in terms of target factors may be understood more intuitively.

Quantification of a Target Factor

In some embodiments, the target factor may be further quantified. As used herein, quantifying a factor refers to determining a metric for the factor. The metric represents a degree of attention, a degree of importance, or a degree of applied force to the factor. The metric for the target factor 102 may be determined based on a group of keywords corresponding to the target factor 102 and the text 101 in the text set 105.

The metric may be represented as the number of occurrences of a group of keywords corresponding to the target factor 102 in the text 101. The metric for the target factor 102 may be determined for each text 101. In this case, the number of occurrences of keywords in each text 101 may be determined as a metric. In the embodiment where the text 101 originates from the information collection form 150, the number of occurrences of a keyword may be determined for each response record for the information collection form 150. In some embodiments, the sentiment of the text may be analyzed and the number of occurrences of a keyword may be determined based on text with sentiment. Such embodiments will be described below with reference to FIG. 7.

For example, in order to determine the metric for a target factor "leg room" corresponding to the keyword grouping 470, the number of occurrences of keywords "leg", "leg room", and "leg space" in each text 101 may be determined. FIG. 6A illustrates an example of the metric of a target factor "leg room". Each numerical value in a column 610 represents the number of occurrences of the keywords "leg", "leg room", and "leg space" in the corresponding text of the column 258.

Alternatively, the metric for the target factor 102 may be represented as the sentiment level of the sentence in the text 101 that includes keywords corresponding to the target factor 102. Sentiment levels may be divided into five levels, which may be represented by values 1 to 5, respectively. The metric of the target factor 102 may be determined for each text 101. In this case, the sentiment level of a sentence containing keywords in each text 101 may be determined. In the embodiment where the text 101 originates from the information collection form 150, the sentiment level of a sentence is determined for each response record.

Taking the target factor "leg room" as an example, in order to determine its metric, the sentiment level of a sentence that contains at least one of the keywords "leg", "leg room", and "leg space" in each text 101 may be determined. FIG. 6B illustrates an example of the metric of the target factor "leg room". Each numerical value in a column 620 represents a sentiment level of a sentence containing at least one of the keywords "leg", "leg room", and "leg space" in the corresponding text of the column 258. A value "0" may indicate that the corresponding text does not contain the keywords "leg", "leg room", and "leg space", or indicate that a sentence containing the keywords "leg", "leg room", and "leg space" are a neutral sentence without sentiment. Furthermore, in order to align with the metric scale of a structured factor, a preliminary quantified value may be transformed. For example, the value "0" may be converted to a rating of 3 to represent neutral sentiment. It should be understood that the above is only an example of quantifying the target factor, and in the embodiments of the present disclosure, the target factor may be quantified in any appropriate way and times.

It should be understood that the metric values of the target factors shown in FIG. 6A and FIG. 6B are only illustrative and are not intended to limit the scope of the present disclosure. The quantification of the target factors described above may be achieved by either or both of the first computing device 110 or the second computing device 120. The method described below may also be used to quantify target factors.

Determination of Key Factors

Figure 7:
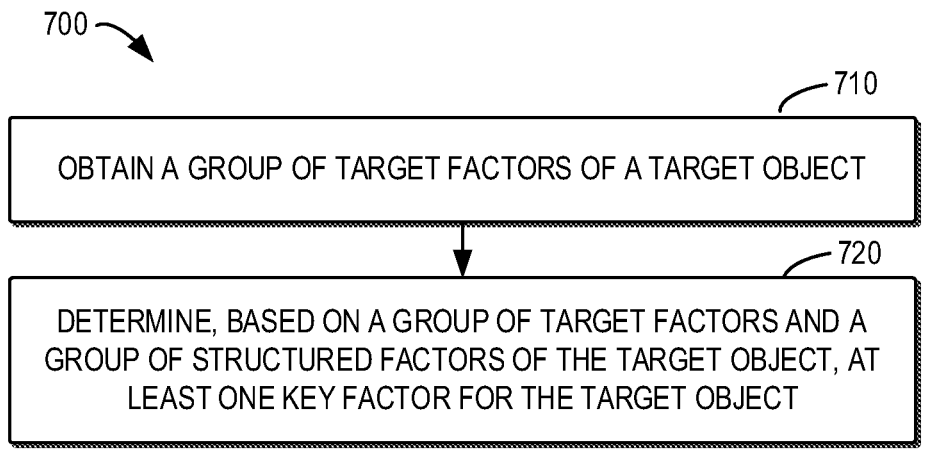
FIG. 7 illustrates a flowchart of a process of determining a key factor according to some embodiments of the present disclosure.

FIG. 7 illustrates a flowchart of a process 700 for determining key factors according to some embodiments of the present disclosure. The process 700 may be implemented at the second computing device 120. For sake of discussion, the process 700 is described with reference to FIG. 1 and FIG. 7.

At block 710, the second computing device 120 obtains a group of target factors 102 of a target object. The target factor 102 is determined based on an unstructured text set 105 about the target object, and each target factor 102 represents an aspect of the target object.

In some embodiments, the second computing device 120 may receive an indication of the target factor 102 from the first computing device 110, as shown in FIG. 1. Alternatively, in some embodiments, the second computing device 120 may determine the target factor 102 based on the text set 105, as described above with reference to FIG. 3.

The second computing device 120 also receives or determines the group of structured factors 103 of the target object. The structured factor 103, for example, originates from the information collection form 150, as described with reference to FIG. 1. At least one target factor in the group of target factors 102 is different from the group of structured factors 103. In some embodiments, all target factors 102 are different from structured factors 103.

At block 720, the second computing device 120 determines at least one key factor 104 for the target object based on the group of target factors 102 and the group of structured factors 103 of the target object. In some embodiments, the second computing device 120 may determine the number of occurrences of keywords corresponding to each factor in the text set 105. The target factor 102 and the structured factor 103 are sorted based on the number of occurrences, and a certain number of factors with a higher ranking are determined as key factors.

In some embodiments, in order to determine a key factor, the second computing device 120 may quantify the target factor and the structured factor. Specifically, the second computing device 120 may determine respective first metrics for the group of target factors 102 by analyzing sentiment of the text 101 in the text set 105. The first metric represents the degree of attention to the respective target factor. The second computing device 120 may also determine respective second metrics for the group of structured factors 103. A second metric represents the degree of attention to the respective structured factor. In order to determine the key factors, metrics of different types of factors should be consistent. Therefore, the second metric matches the first metric in terms of metric scale.

In some embodiments, the first metric may be represented as the number of occurrences of a keyword. For each target factor in a group of target factors, a sentence containing a keyword corresponding to the target factor and having sentiment may be determined from the text 101 of the text set 105. Based on the number of occurrences of the keyword corresponding to the target factor in the sentence, the first metric for the target factor may be determined.

As an example, for a target factor "leg room", a sentence including keywords "leg", "leg room", and "leg space" and having sentiment may be determined in each text 101. The number of occurrences of keywords "leg", "leg room", and "leg space" in these sentences are determined as the first metric. For example, the column 610 in FIG. 6A shows the first metric for the target factor "leg room".

In this embodiment, in order to match the second metric for the structured factor with the first metric, it is not suitable to use a rating in columns 252 to 258 directly as the second metric. To this end, it is necessary to re-quantify the structured factor. Specifically, for each structured factor in a group of structured factors, the second computing device 120 may determine a sentence containing a keyword corresponding to the structured factor and having sentiment from the text 101. Based on the number of occurrences of a keyword corresponding to the structured factor in the sentence, the second metric for the structured factor may be determined.

As an example, for a structured factor "food and beverage", a sentence containing the keywords "food", "meal", "drink", and "snack" and having sentiment may be determined in each text 101. The number of occurrences of keywords "food", "meal", "drink", and "snack" in these sentences are determined as the second metric. For example, a column 630 in FIG. 6A illustrates the second metric for the structured factor "food and beverage".

Alternatively, in some embodiments, the first metric may be represented as a sentiment level of a sentence containing a keyword. For each target factor in a group of target factors, a sentence containing a keyword corresponding to the target factor and having sentiment may be determined from the text 101 in the text set 105. Based on the sentiment level of the sentence, the first metric for the target factor is determined. The sentiment level of a sentence may be determined in any suitable way, and the embodiments of the present disclosure are not limited in this regard.

As an example, for a target factor "leg room", a sentence including keywords "leg", "leg room", and "leg space" and having sentiment may be determined in each text 101. The sentiment level of the sentence is determined as the first metric. For example, the column 620 in FIG. 6B shows the first metric for a target factor "leg room".

In this embodiment, for each structured factor in the group of structured factors 103, the second metric for the structured factor may be determined based on a response to a closed-ended question about the structured factor. For example, a user's rating of the structured factor may be used as the second metric. In FIG. 6B, ratings in columns 252 to 258 may be used as the second metric for the corresponding structured factor. From FIG. 6A and FIG. 6B, it may be seen that the first metric and the second metric are determined for each response record.

The determination of the first metric and second metric are described above. The second computing device 120 may then determine the influence degree of each factor on the target object based on the respective first metric of the group of target factors 102 and the respective second metric of the group of structured factors 103. The influence degree may be determined based on any suitable algorithm. Such an algorithm may include but is not limited to linear regression, logistic regression, Shapley value, and so on.

A factor strength of each target factor 102 and each structured factor 103 may be determined as an indicator of the influence degree. The factor strength represents the importance degree of the corresponding factor to a result related to the target object. The result related to the target object may include, for example, performance, overall evaluation of the target object, the satisfaction degree of the target object, and so on. For example in FIG. 2, the result related to the target object is a response to the closed-ended question 220, which is listed as a rating in the column 251.

Then, a key factor may be selected from the target factor 102 and the structured factor 103 based on the influence degree. For example, a certain number of factors with a higher ranking of the influence degree may be chosen. In this article, a process of ranking factors based on the influence degree of a factor on the target object (for example, the factor strength) is also known as "key factor ranking (KFR)".

In some embodiments, key factors may be selected from the group of target factors 102 and the group of structured factors 103, respectively. Specifically, a first number of target factors may be selected as key factors from the group of target factors 102 based on respective influence degrees of the group of target factors 102 on the target object. A second number of structured factors may be selected as key factors from the group of structured factors 103 based on respective influence degrees of the group of structured factors 103 on the target object.

The values of the first number and the second number may be predetermined. Alternatively, the selected factor may be a factor with an influence degree greater than a threshold level (for example, the factor strength greater than a threshold strength). In this case, the values of the first number and the second number are not predetermined. The implementation of the present disclosure is not restricted in this regard.

Figure 8A:
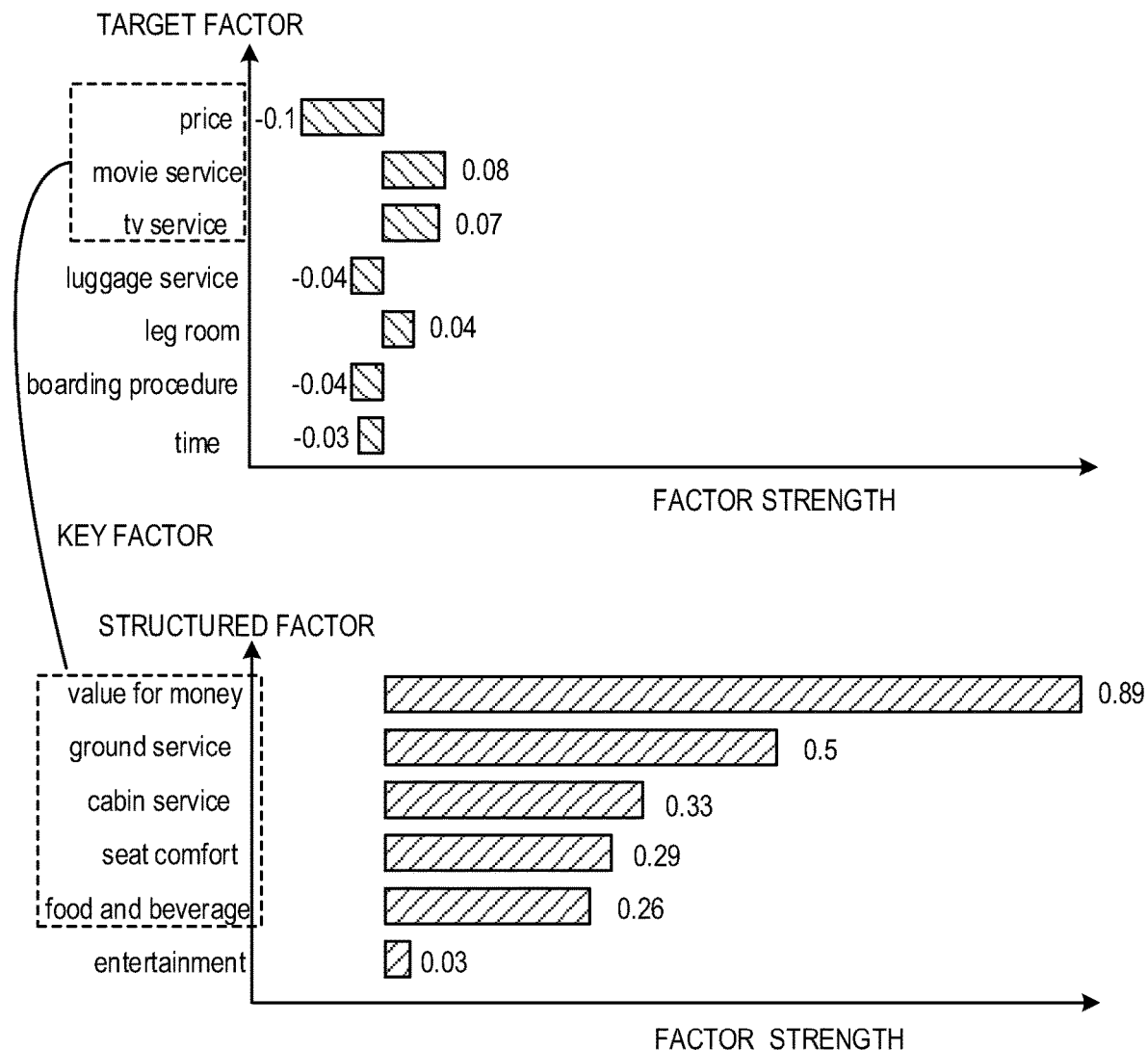
FIG. 8A illustrates a schematic diagram of selecting a key factor from target factors and structured factors respectively according to some embodiments of the present disclosure.

FIG. 8A illustrates results of sorting key factors for target factors and structured factors respectively. The factor strength in the horizontal axis of FIG. 8A represents the influence degree of corresponding factors on the target object. As shown in the figure, according to the factor strength, target factors "price", "movie service", and "tv service" as the key factors from the target factors. According to the strength of factors, select structured factors "value for money", "ground service", "cabin service", "seat comfort", and "food and beverage" are selected as key factors.

In some embodiments, a key factor may be selected from a union of the group of target factors 102 and the group of structured factors 103. Specifically, a third number of factors may be selected as the key factors from a union of the group of target factors 102 and the group of structured factors 103, according to respective influence degrees of the group of target factors 102 on the target object and respective influence degrees of the group of structured factors 103 on the target object.

The value of the third number may be predetermined. Alternatively, the selected factor may be a factor with the influence degree greater than a threshold level (for example, the factor strength greater than a threshold strength). In this case, the value of the third number is not predetermined. The implementation of the present disclosure is not restricted in this regard.

Figure 8B:
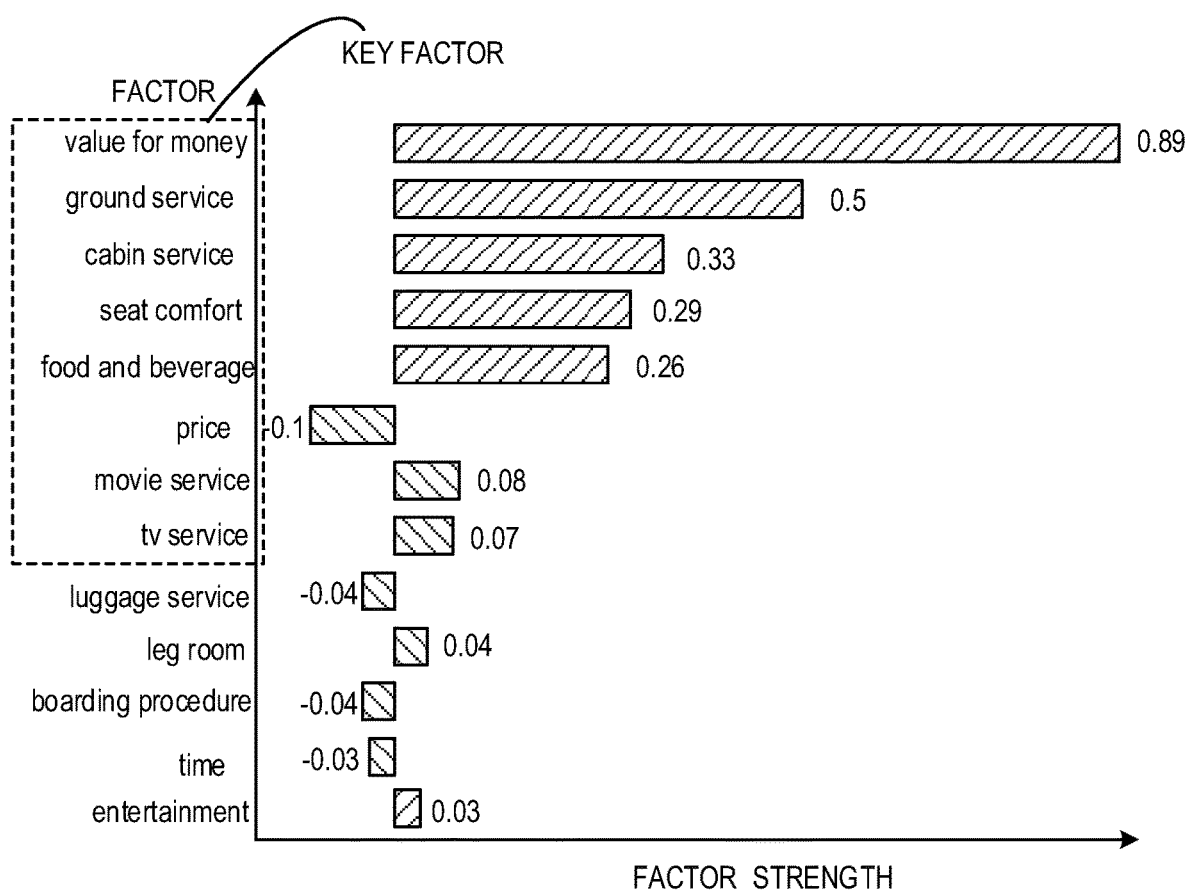
FIG. 8B illustrates a schematic diagram of selecting a key factor from a union set of target factors and structured factors according to some embodiments of the present disclosure.

FIG. 8B illustrates a result of ranking key factors for both target factors and structured factors. The factor strength in the horizontal axis in FIG. 8B represents the influence degree of corresponding factors on the target object. As shown in the figure, according to the factor strength, factors "value for money", "ground service", "cabin service", "seat comfort", "food and beverage", "price", "movie service", and "tv service" are selected as key factors.

Presentation of an Information Collection Form

Figure 9:
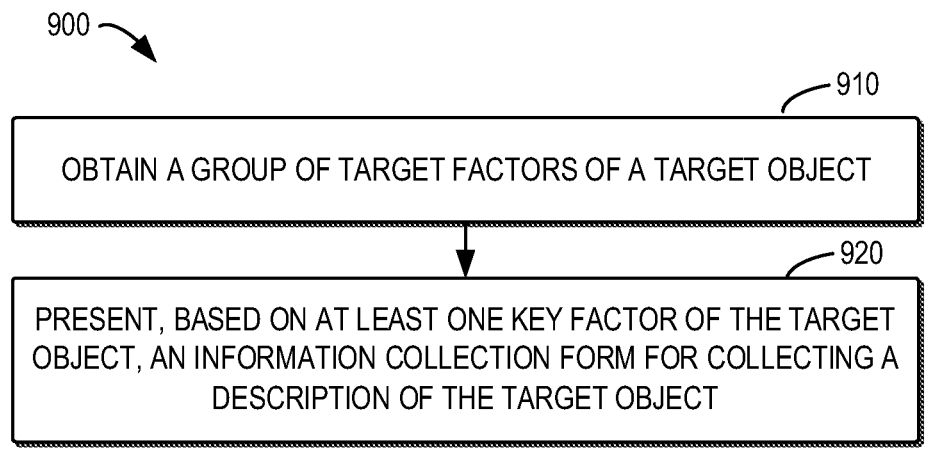
FIG. 9 illustrates a flowchart of a process of presenting an information mobile phone form according to some embodiments of the present disclosure.

FIG. 9 illustrates a flowchart of a process 900 of presenting an information collection form according to some embodiments of the present disclosure. The process 900 may be implemented at the third computing device 130. For sake of discussion, the process 900 is described with reference to FIG. 1 and FIG. 9.

At block 910, the third computing device 130 obtains the group of target factors 102 of a target object. The target factor 102 is determined based on an unstructured text set 105 about the target object, and each target factor 102 represents an aspect of the target object.

In some embodiments, the third computing device 130 may receive an indication of the target factor 102 from the first computing device 110, as shown in FIG. 1. Alternatively, in some embodiments, the third computing device 130 may determine the target factor 102 based on the text set 105, as described above with reference to FIG. 3.

At block 920, the third computing device 130 presents an information collection form for collecting descriptions of the target object based on the at least one key factor 104 of the target object. The at least one key factor 104 is determined from the group of structured factors 103 and the group of target factors 102 of the target object. In some embodiments, the third computing device 130 may receive an indication about the at least one key factor 104 from the second computing device 120, as shown in FIG. 1. Alternatively, in some embodiments, the third computing device 130 may determine a key factor from the group of structured factors 103 and the group of target factors 102, as described above with reference to FIG. 7.

In some embodiments, the text 101 in the text set 105 is derived from a response to an open-ended question in an information collection form including a corresponding closed-ended question about the group of structured factors 103. In this embodiment, the third computing device presents an updated version of the information collection form based on at least one key factor. The updated version includes an updated closed-ended question. In this way, the new information collection form may collect a user's evaluation of a concerned aspect more directly.

As an example, based on the information collection form 150 and the corresponding response set 250 shown in FIG. 2, key factors such as "value for money", "ground service", "cabin service", "seat comfort", "food and beverage", "price", "movie service", and "tv service" are determined, as shown in FIG. 8B. The third computing device 130 presents the information collection form 160 shown in FIG. 10, which is an updated version of the information collection form 150 shown in FIG. 2. Comparing FIG. 2 and FIG. 10, the closed-ended questions 210-1 to 210-6 are updated to closed-ended questions 210-1, 210-2, 210-3, 210-5, 210-6, and 1010.

In some embodiments, if the at least one key factor 104 includes a target factor, the third computing device 130 may add a closed-ended question about the target factor in an updated version of the information collection form. The third computing device 130 further presents an updated version of the information collection form including the closed-ended question.

Continuing with the above example, key factors include a target factor "price". Correspondingly, the presented information collection form 160 includes a closed-ended question 1010 about the target factor "price". In this way, an aspect that a user is likely to be concerned about is added as a structured factor in the information collection form. This helps to collect user evaluation of the target object more comprehensively and conveniently.

In some embodiments, if the at least one key factor 104 does not include a structured factor, the third computing device 130 may remove a closed-ended question about the structured factor from the information collection form. The third computing device 130 may then present an updated version in which the closed-ended question about the structured factor has been removed.

Continuing with the above example, the key factor does not include the structured factor "entertainment" in the information collection form 150. Correspondingly, the closed-ended question 210-4 about the structured factor "entertainment" is removed. Compared to the information collection form 150, the presented information collection form 160 does not include the closed-ended question 210-4. In this way, an aspect that a user may not concerned about is removed from the information collection form. This may avoid interference from an unimportant question to a user.

Alternatively, or in addition, in some embodiments, while the information collection form is presented, the third computing device 130 may present a prompt about a target factor included in a key factor. The prompt promotes a user to provide a description of the target factor, for example experience, evaluation, a satisfaction degree, and so on. Specifically, while the information collection form 160 is presented, the third computing device 130 may detect a response to the open-ended question 230 in the information collection form 160. If it is detected that a response is being provided, the third computing device 130 may present such a prompt.

Figure 11:
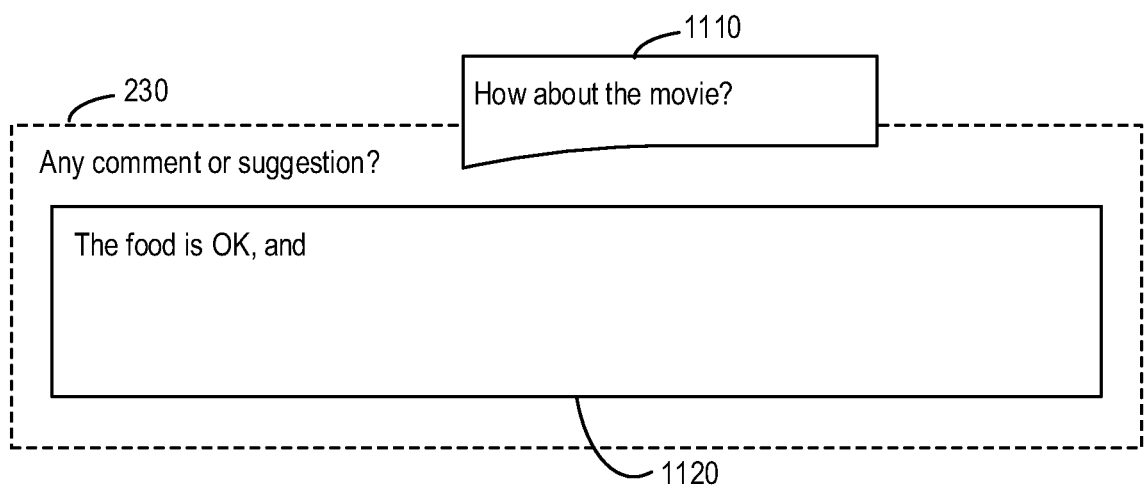
FIG. 11 illustrates a schematic diagram of a prompt regarding a target factor according to some embodiments of the present disclosure.

FIG. 11 illustrates an example of a prompt about a target factor. Continuing with the above example, the key factor includes a target factor "movie service". As shown in the figure, a user is typing the text "The food is OK, and" in a text box 1120 of the open-ended question 230. In response to detecting that the text is being typed, the third computing device 130 may present a prompt 1110 "How about the movie" regarding the target factor "movie service". The prompt 1110 reminds the user to provide experience or evaluation of the target factor "movie service".

In some embodiments, the third computing device 130 may determine and present the information collection form 160 in an interactive way. Specifically, the third computing device 130 may present the at least one key factor 104. While at least one key factor is presented, the third computing device 130 may detect the selection of at least one key factor. If a selection of at least one key factor is detected, the third computing device 130 may add a closed-ended question about the selected key factor to the information collection form 160, thereby presenting the information collection form 160 including the closed-ended question.

In this embodiment, the third computing device 130 may be a device related to a domain expert of a target object. The determined key factor is presented to the domain expert. The domain expert may determine a key factor that requires adding a closed-ended question. The third computing device 130 may set a closed-ended problem in the information collection form 160 based on a selection of the domain expert. In this way, objective data may be used to assist a domain expert in designing a better information collection form, for example a better questionnaire.

Topic Model and Sentiment Expression

The determination and quantification of a target factor is described above with reference to FIG. 3 to FIG. 6B. A keyword-assisted topic model may be used to extract a target factor from the text set 105. The keyword-assisted topic model (hereinafter referred to as a topic model) combines domain knowledge into the topic model through an "anchor word". The anchor word may be used as a marker for a specific topic, that is, the anchor word encourages the topic model to search for a topic related to the anchor word. Therefore, the anchor word helps the topic model separate different topics from each other. The Topic model can help identify a topic of interest. The topic model includes but is not limited to Anchored CorEX.

In view of this, the topic model may be used to determine a target factor implied in the text set 105. A plurality of keywords extracted from the text set 105 may be used as anchor words of the topic model. In this case, a topic obtained from the topic model may be used as the target factor 102. Through the topic model, an individual keyword is anchored to a theme. Therefore, the topic model may also be used to determine a corresponding relationship between a target factor and a keyword.

A sentiment representation may be used to quantify the target factor obtained from the topic model. Any text analysis method that can analyze sentiment may be used. As an example, a Linguistic Inquiry and Word Count (LIWC) dictionary may be used. The LIWC dictionary may map words to multiple categories. These categories may capture lexical and semantic features of text. Categories related to positive sentiment may be used. The LIWC categories that measure positive sentiment are grouped. LIWC categories related to positive sentiment may be used. A vector representation of positive sentiment is the frequency of words belonging to categories of positive sentiment. An estimation of a certain target factor may be composed of a vector representation of binary anchored theme variables and sentiment.

Multimodal Model

Figure 12A:
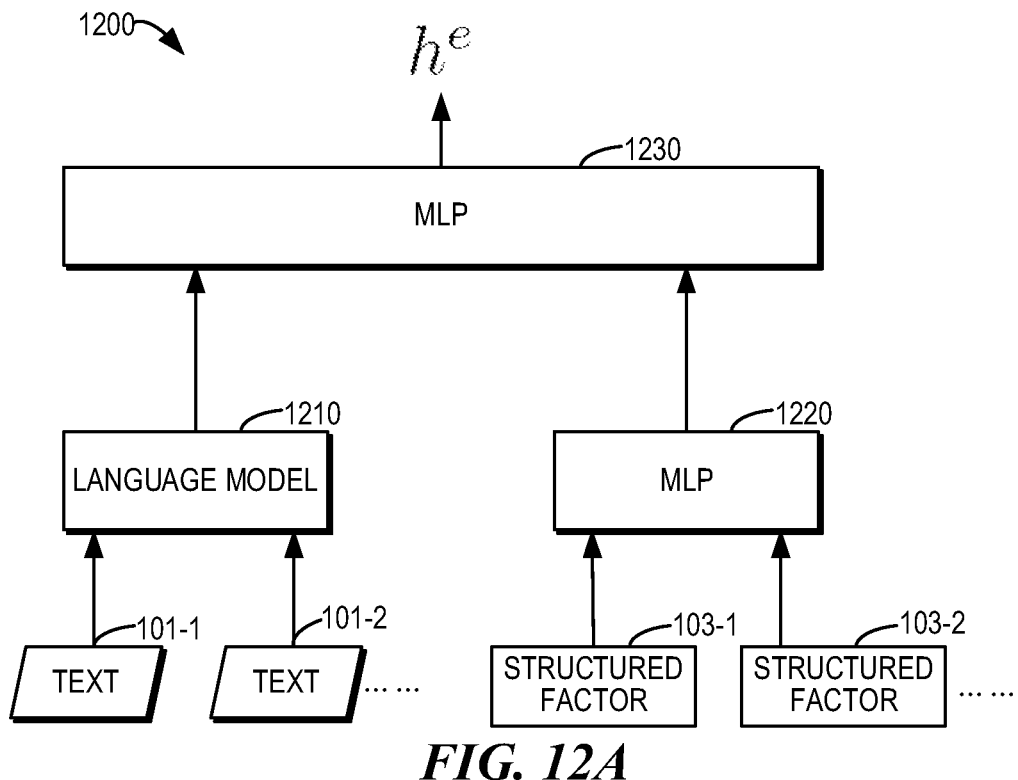
FIG. 12A illustrates a schematic diagram of a machine learning model for propensity scoring according to some embodiments of the present disclosure.

A machine learning model may also be used to analyze information that includes both text and predetermined options (such as the response set 250). FIG. 12A illustrates a machine learning model 1200 for propensity scoring. A language model 1210 in the model 1200 is configured to generate feature representations of the text 101, which may be considered as a target factor determined from the text set 105. Unlike the process described in FIG. 3 above, the target factor determined in this way is an implicit representation.

A multilayer perception (MLP) layer 1220 is used to generate feature representations of the structured factor 103. If the structured factor 103 includes both a numerical factor (for example, those shown in FIG. 2) and a categorical factor (for example, cabin category), the MLP layer 1220 may include two MLP layers, which are used to handle the numerical factor and the categorical factor, respectively.

The MLP layer 1230 generates a feature $h^e$ based on the feature representation of the text 101 and the structured factor 103. A propensity score may be determined by applying a softmax activation function to features.

The cross-entropy loss function may be used to train the model 1200. The language model 1210 may be any suitable type of language representation model, for example a Bidirectional Encoder Representations from Transformers (BERT) model.

Figure 12B:
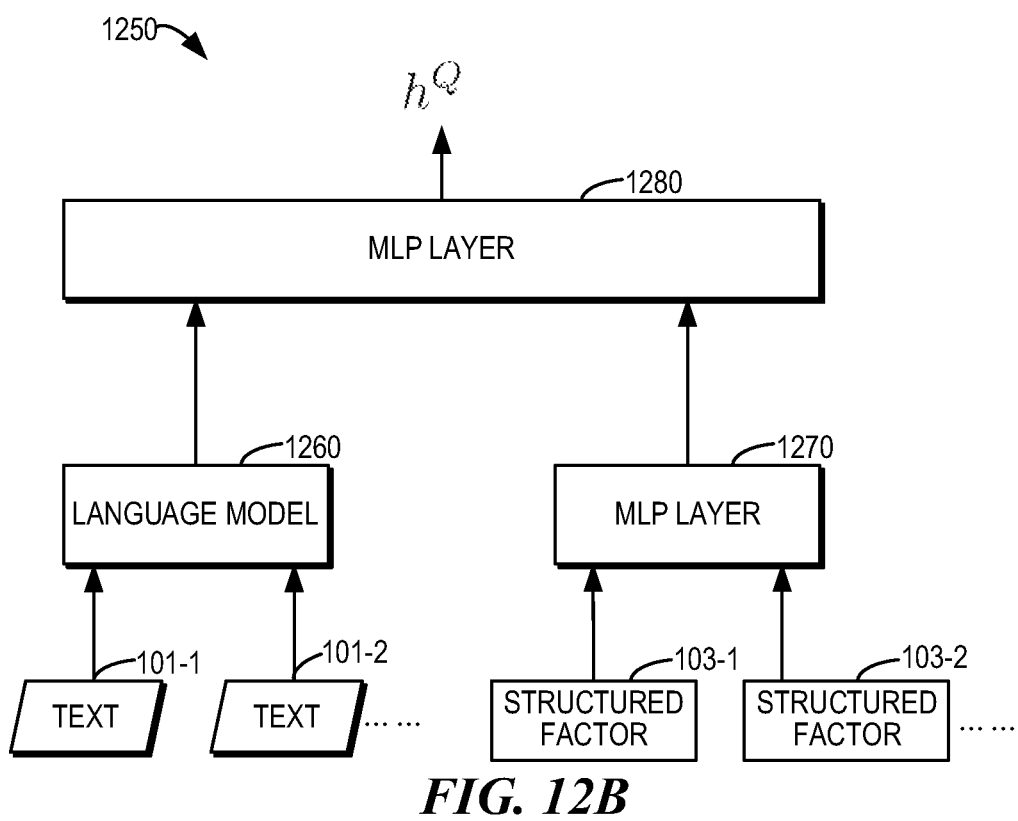
FIG. 12B illustrates a schematic diagram of a machine learning model for conditional result expectation according to some embodiments of the present disclosure.

FIG. 12B illustrates a machine learning model 1250 for conditional result expectation. A language model 1260 in the model 1250 is configured to generate feature representations of the text 101, which may be considered as a target factor determined from the text set 105. The target factor determined in this way is an implicit representation.

An MLP layer 1270 is used to generate feature representations of the structured factor 103. If the structured factor 103 includes a numerical factor (for example, those shown in FIG. 2) and a categorical factor (for example, cabin category), the MLP layer 1270 may include two MLP layers, which are used to handle the numerical factor and the categorical factor, respectively.

An MLP layer 1280 generates a feature $h^Q$ based on feature representations of the text 101 and feature representations of the structured factor 103. In a case that a result Y is discontinuous (for example, a category or a value), a conditional result expectation may be determined by applying a softmax activation function to the feature $h^Q$. In a case that the result Y is continuous, the conditional result expectation may be determined by applying a linear activation function to the feature $h^Q$.

In the case that the result Y is discontinuous, the cross-entropy loss function may be used to train the model 1250. In the case that the result Y is continuous, the mean squared error (MSE) may be used to train the model 1250. Similar to the language model 1210, The language model 1260 may be any suitable type of language representation model, such as a BERT model.

Key factors may be ranked based on one or both of the propensity score and conditional result expectation. From this, a key factor of a target object may be determined. The process 700 may also be implemented using the machine learning model described here.

Example Device

Figure 13:
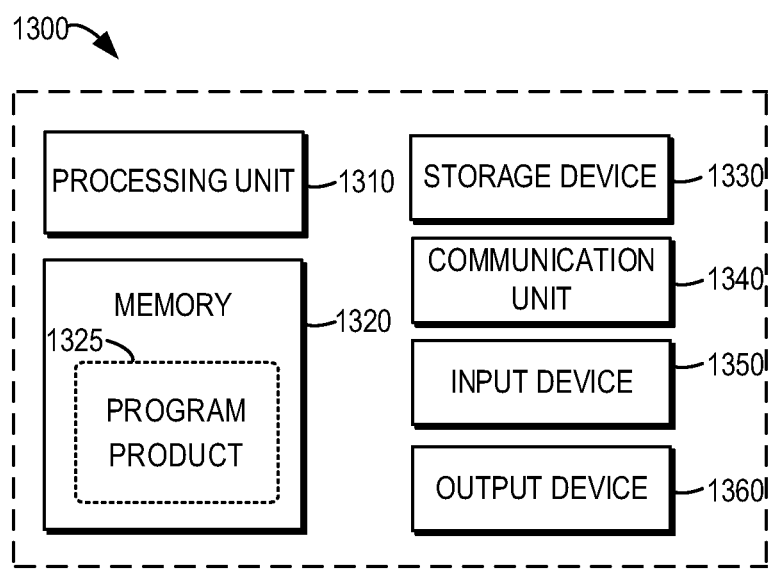
FIG. 13 illustrates a block diagram of a device capable of implementing multiple embodiments of the present disclosure.

FIG. 13 illustrates a block diagram of a computing device 1300 in which one or more embodiments of the present disclosure can be implemented. It should be understood that the computing device 1300 shown in FIG. 13 is only exemplary and should not constitute any limitation on the functionality and scope of the embodiments described herein. The computing device 1300 shown in FIG. 13 may be used to implement the first computing device 110, the second computing device 120, or third computing device 130 of FIG. 1.

As shown in FIG. 13, the computing device 1300 is in the form of a general purpose computing device. The components of computing device 1300 may include, but are not limited to, one or more processors or processing units 1310, memory 1320, storage device 1330, one or more communication units 1340, one or more input devices 1350, and one or more output devices 1360. The processing unit 1310 may be an actual or virtual processor and can execute various processes based on the programs stored in the memory 1320. In a multiprocessor system, multiple processing units execute computer executable instructions in parallel to improve the parallel processing capability of computing device 1300.

The computing device 1300 typically includes multiple computer storage media. Such media can be any accessible media that can be accessed by the computing device 1300, including but not limited to volatile and non-volatile media, removable and non removable media. The memory 1320 can be a volatile memory (such as registers, cache, random access memory (RAM)), a non-volatile memory (such as read-only memory (ROM), an electrically erasable programmable read-only memory (EEPROM), flash memory), or some combination thereof. The storage device 1330 can be a removable or non removable medium, and can include machine readable media such as flash drives, disks, or any other medium that can be used to store information and/or data (such as training data for training) and can be accessed within the computing device 1300.

The computing device 1300 may further include additional removable/non removable, volatile/non-volatile storage media. Although not shown in FIG. 13, a disk drive for reading or writing from a removable, non-volatile disk (such as a "floppy disk") and an optical disk drive for reading or writing from a removable, non-volatile disk can be provided. In these cases, each driver can be connected to the bus by one or more data medium interfaces (not shown). The memory 1320 can include a computer program product 1325, which has one or more program modules configured to perform various methods or actions of the embodiments of the present disclosure.

The communication unit 1340 enables communication with other computing devices through a communication medium. Additionally, the functions of the components of the computing device 1300 may be implemented in a single computing cluster or multiple computing machines, which can communicate through communication connections. Therefore, the computing device 1300 can operate in a networked environment using logical connections to one or more other servers, network personal computers (PCs), or another network node.

The input device 1350 may be one or more input devices, such as a mouse, keyboard, trackball, and so on. The output device 1360 can be one or more output devices, such as a display, speaker, printer, and so on. The computing device 1300 can also communicate with one or more external devices (not shown) through the communication unit 1340 as needed, such as storage devices, display devices, and so on, to communicate with one or more devices that enable users to interact with the computing device 1300, or to communicate with any device (such as a network card, modem, and so on) that enables the computing device 1300 to communicate with one or more other computing devices. Such communication can be performed through input/output (I/O) interfaces (not shown).

According to the exemplary implementations of the present disclosure, a computer readable storage medium is provided, on which computer executable instructions are stored, wherein the computer executable instructions are executed by a processor to implement the method described above. According to the exemplary implementation of the present disclosure, a computer program product is also provided, which is tangibly stored on a non transient computer readable medium and includes computer executable instructions, which are executed by a processor to implement the method described above.

The following are some implementation methods of the present disclosure.

In a first aspect, the present disclosure provides a method of information processing. The method comprises: extracting a plurality of keywords from an unstructured text set for a target object; grouping at least a portion of the plurality of keywords based on semantics of the plurality of keywords; and determining a target factor corresponding to a group of keywords based on a result of the grouping, the target factor representing an aspect of the target object.

In some embodiments of the first aspect, the method further comprises determining at least one target sentence related to the target factor based on the text set, the at least one target sentence reflecting a perspective about the target factor.

In some embodiments of the first aspect, determining the at least one target sentence comprises: extracting, from the text set, at least one candidate sentence containing at least one keyword in the group of keywords; and determining the at least one target sentence based on the at least one candidate sentence.

In some embodiments of the first aspect, the at least one target sentence comprises at least one of: a sentence that reflects a positive perspective on the target factor, a sentence that reflects a negative perspective on the target factor.

In some embodiments of the first aspect, determining the target factor comprises: determining whether the group of keywords are similar to a structured factor of the target object in terms of semantics; and in accordance with a determination that the group of keywords are not similar to the structured factor in terms of semantics, determining the target factor based on the group of keywords.

In some embodiments of the first aspect, the method further comprises determining a metric for the target factor based on the group of keywords and the text in the text set, and the metric represents the degree of attention to the target factor.

In some embodiments of the first aspect, determining the metric comprises at least one of: determining the number of occurrences of the group of keywords in the text, determining a sentiment level of a sentence in the text, wherein the sentence in the text comprises a keyword in the group of keywords.

In some embodiments of the first aspect, extracting the plurality of keywords comprises: extracting a candidate word from text in the text set; and in accordance with a determination that the number of occurrences of the candidate word in the text set exceeds a threshold number, determining the candidate word as one of the plurality of keywords.

In some embodiments of the first aspect, grouping at least a portion of the plurality of keywords comprises: clustering the plurality of keywords to determine a plurality of clusters each comprising at least one keyword; determining respective qualities of the plurality of clusters, a quality representing an aggregation degree in terms of semantics of keywords in the respective cluster; removing, from the plurality of keywords, keywords in a cluster with the quality lower than a threshold quality to determine remaining keywords; and grouping the remaining keywords based on semantics of the remaining keywords.

In a second aspect, the present disclosure provides an electronic device comprising at least one processing circuit. The at least one processing circuit is configured to extract a plurality of keywords from an unstructured text set for a target object; group at least a portion of the plurality of keywords based on semantics of the plurality of keywords; and determine a target factor corresponding to a group of keywords based on a result of the grouping, the target factor representing an aspect of the target object.

In some embodiments of the second aspect, the at least one processing circuit is further configured to determine at least one target sentence related to the target factor based on the text set, the at least one target sentence reflecting a perspective about the target factor.

In some embodiments of the second aspect, at least one processing circuit is configured to: extract, from the text set, at least one candidate sentence containing at least one keyword in the group of keywords; and determine the at least one target sentence based on the at least one candidate sentence.

In some embodiments of the second aspect, the at least one target sentence comprises at least one of: a sentence that reflects a positive perspective on the target factor, a sentence that reflects a negative perspective on the target factor.

In some embodiments of the second aspect, the at least one processing circuit is configured to: determine whether the group of keywords are similar to a structured factor of the target object in terms of semantics; and in accordance with a determination that the group of keywords are not similar to the structured factor in terms of semantics, determine the target factor based on the group of keywords.

In some embodiments of the second aspect, the at least one processing circuit is further configured to: determine a metric for the target factor based on the group of keywords and text in the text set, the metric representing a degree of attention to the target factor.

In some embodiments of the second aspect, the at least one processing circuit is configured to perform at least one of: determining the number of occurrences of the group of keywords in the text, determining a sentiment level of a sentence in the text, wherein the sentence in the text comprises a keyword in the group of keywords.

In some embodiments of the second aspect, the at least one processing circuit is configured to: extract a candidate word from text in the text set; and in accordance with a determination that the number of occurrences of the candidate word in the text set exceeds a threshold number, determine the candidate word as one of the plurality of keywords.

In some embodiments of the second aspect, the at least one processing circuit is configured to: clustering the plurality of keywords to determine a plurality of clusters each comprising at least one keyword; determining respective qualities of the plurality of clusters, a quality representing an aggregation degree in terms of semantics of keywords in the respective cluster; removing, from the plurality of keywords, keywords in a cluster with the quality lower than a threshold quality to determine remaining keywords; and grouping the remaining keywords based on semantics of the remaining keywords.

In a third aspect, the present disclosure provides a computer readable storage medium having computer programs stored thereon. The computer program is executable by a processor to implement a method of information processing of the first aspect.

In a fourth aspect, the present disclosure provides a method of information processing. The method comprises: obtaining a group of target factors of the target object determined based on an unstructured text set about the target object, and each target factor representing an aspect of the target object; and determining at least one key factor for the target object based on the group of target factors and a group of structured factors of the target object, wherein at least one target factor in the group of target factors is different from the group of structured factors.

In some embodiments of the fourth aspect, determining the at least one key factor comprises: selecting a first number of target factors from the group of target factors as a part of the at least one key factor according to respective influence degrees of the group of target factors on the target object; and selecting, from the group of structured factors, a second number of structured factors as a part of the at least one key factor according to respective influence degrees of the group of structured factors on the target object.

In some embodiments of the fourth aspect, determining the at least one key factor comprises: selecting, from a union of the group of target factors and the group of structured factors, a third number of factors as the at least one key factor according to respective influence degrees of the group of target factors on the target object and respective influence degrees of the group of structured factors on the target object.

In some embodiments of the fourth aspect, determining the at least one key factor comprises: determining respective first metrics for the group of target factors by analyzing sentiment of text in the text set, a first metric representing a degree of attention to the respective target factor; determining respective second metrics for the group of structured factors, a second metric representing a degree of attention to the respective structured factor, and the second metric matches the first metric in terms of metric scale; and determining the at least one key factor based on the first and second metrics.

In some embodiments of the fourth aspect, determining the first metric comprises: determining, for a target factor in the group of target factors from text in the text set, a first sentence containing a first keyword corresponding to the target factor and having sentiment; and determining the first metric for the target factor based on the number of occurrences of the first keyword in the first sentence, and wherein determining the second metric comprises: determining, for a structured factor in the group of structured factors from the text, a second sentence containing a second keyword corresponding to the structured factor and having sentiment; determining the second metric for the structured factor based on the number of occurrences of the second keyword in the second sentence.

In some embodiments of the fourth aspect, determining the first metric comprises: determining, for a target factor in the group of target factors from text in the text set, a sentence containing a keyword corresponding to the target factor and having sentiment; determining the first metric for the target factor based on a sentiment level of the sentence, and determining the second metric comprises: determining, for a structured factor in a group of structured factors, the second metric for the structured factor based on a response to a closed-ended question about the structured factor.

In some embodiments of the fourth aspect, determining the at least one key factor based on the first and second metrics comprises: determining, based on the first and second metrics, respective influence degrees of factors in the group of target factors and the group of structured factors on the target object; and selecting, based on the respective influence degrees, the at least one key factor from the group of target factors and the group of structured factors.

In some embodiments of the fourth aspect, the determination of respective influence degrees is according to at least one of linear regression, logistic regression, Shapley value.

In a fifth aspect, the present disclosure provides an electronic device comprising at least one processing circuit. The at least one processing circuit is configured to obtain a group of target factors of the target object determined based on an unstructured text set about the target object, and each target factor representing an aspect of the target object; and determine at least one key factor for the target object based on the group of target factors and a group of structured factors of the target object, wherein at least one target factor in the group of target factors is different from the group of structured factors.

In some embodiments of the fifth aspect, the at least one processing circuit is further configured to: select a first number of target factors from the group of target factors as a part of the at least one key factor according to respective influence degrees of the group of target factors on the target object; and select, from the group of structured factors, a second number of structured factors as a part of the at least one key factor according to respective influence degrees of the group of structured factors on the target object.

In some embodiments of the fifth aspect, the at least one processing circuit is further configured to: select, from a union of the group of target factors and the group of structured factors, a third number of factors as the at least one key factor according to respective influence degrees of the group of target factors on the target object and respective influence degrees of the group of structured factors on the target object.

In some embodiments of the fifth aspect, the at least one processing circuit is further configured to: determine respective first metrics for the group of target factors by analyzing sentiment of text in the text set, a first metric representing a degree of attention to the respective target factor; determine respective second metrics for the group of structured factors, a second metric representing a degree of attention to the respective structured factor, and the second metric matches the first metric in terms of metric scale; and determine the at least one key factor based on the first and second metrics.

In some embodiments of the fifth aspect, the at least one processing circuit is further configured to: determine, for a target factor in the group of target factors from text in the text set, a first sentence containing a first keyword corresponding to the target factor and having sentiment; and determine the first metric for the target factor based on the number of occurrences of the first keyword in the first sentence, and wherein the at least one processing circuit is further configured to: determine, for a structured factor in the group of structured factors from the text, a second sentence containing a second keyword corresponding to the structured factor and having sentiment; determine the second metric for the structured factor based on the number of occurrences of the second keyword in the second sentence.

In some embodiments of the fifth aspect, the at least one processing circuit is further configured to: determine, for a target factor in the group of target factors from text in the text set, a sentence containing a keyword corresponding to the target factor and having sentiment; determine the first metric for the target factor based on a sentiment level of the sentence, and the at least one processing circuit is further configured to: determine, for a structured factor in a group of structured factors, the second metric for the structured factor based on a response to a closed-ended question about the structured factor.

In some embodiments of the fifth aspect, the at least one processing circuit is further configured to: determine, based on the first and second metrics, respective influence degrees of factors in the group of target factors and the group of structured factors on the target object; and select, based on the respective influence degrees, the at least one key factor from the group of target factors and the group of structured factors.

In some embodiments of the fifth aspect, the determination of respective influence degrees is according to at least one of linear regression, logistic regression, Shapley value.

In a sixth aspect, the present disclosure provides a computer readable storage medium having a computer program stored thereon. The computer program is executable by a processor to implement the method of the fourth aspect.

In a seventh aspect, the present disclosure provides a method of information processing. The method comprises: obtaining a group of target factors of a target object, the group of target factors determined based on an unstructured text set about the target object, and each target factor representing an aspect of the target object; and presenting, based on at least one key factor of the target object, an information collection form for collecting descriptions of the target object, wherein the at least one key factor is determined from a group of structured factors of the target object and the group of target factors.

In some embodiments of the seventh aspect, text in the text set originates from responses to an open-ended question in the information collection form, and the information collection form comprises respective closed-ended questions about the group of structured factors, and presenting the information collection form comprises presenting an updated version of the information collection form based on the at least one key factor, the updated version comprising an updated closed-ended question.

In some embodiments of the seventh aspect, presenting the updated version of the information collection form comprises: in accordance with a determination that the at least one key factor comprises a first target factor in the group of target factors, presenting the updated version comprising a first closed-ended question about the first target factor.

In some embodiments of the seventh aspect, presenting the updated version of the information collection form comprises: in accordance with a determination that the at least one factor does not include a first structured factor in the group of structured factors, presenting the updated version with a second closed-ended question about the first structured factor removed.

In some embodiments of the seventh aspect, the at least one key factor comprises a second target factor in the group of target factors, and the method further comprises: while the information collection form is presented, detecting a response to an open-ended question in the information collection form; and in response to detecting that the response is being provided, presenting a prompt describing the second target factor.

In some embodiments of the seventh aspect, presenting the information collection form comprises: while the at least one key factor is presented, detecting selection of the at least one key factor; and in response to the detection of the selection of the at least one key factor, presenting the information collection form comprising a closed-ended question about the selected key factor.

In an eighth aspect, the present disclosure provides an electronic device comprising at least one processing circuit. The at least one processing circuit is configured to obtain a group of target factors of a target object, the group of target factors determined based on an unstructured text set about the target object, and each target factor representing an aspect of the target object; and present, based on at least one key factor of the target object, an information collection form for collecting descriptions of the target object, wherein the at least one key factor is determined from a group of structured factors of the target object and the group of target factors.

In some embodiments of the eighth aspect, text in the text set originates from responses to an open-ended question in the information collection form, and the information collection form comprises respective closed-ended questions about the group of structured factors, and the at least one processing circuit is configured to: present an updated version of the information collection form based on the at least one key factor, the updated version comprising an updated closed-ended question.

In some embodiments of the eighth aspect, the at least one processing circuit is configured to: in accordance with a determination that the at least one key factor comprises a first target factor in the group of target factors, present the updated version comprising a first closed-ended question about the first target factor.

In some embodiments of the eighth aspect, the at least one processing circuit is configured to: in accordance with a determination that the at least one factor does not include a first structured factor in the group of structured factors, present the updated version with a second closed-ended question about the first structured factor removed.

In some embodiments of the eighth aspect, the at least one key factor comprises a second target factor in the group of target factors, and the at least one processing circuit is configured to: while the information collection form is presented, detect a response to an open-ended question in the information collection form; and in response to detecting that the response is being provided, present a prompt describing the second target factor.

In some embodiments of the eighth aspect, the at least one processing circuit is configured to: while the at least one key factor is presented, detect selection of the at least one key factor; and in response to the detection of the selection of the at least one key factor, present the information collection form comprising a closed-ended question about the selected key factor.

In a ninth aspect, the present disclosure provides a computer readable storage medium having a computer program stored thereon. The computer program is executable by a processor to implement the method of the seventh aspect.

Various aspects of the present disclosure are described herein with reference to the flowchart and/or block diagram of the method, apparatus, device, and computer program product implemented in accordance with the present disclosure. It should be understood that each box in the flowchart and/or block diagram, and the combination of each box in the flowchart and/or block diagram, may be implemented by computer-readable program instructions.

These computer-readable program instructions may be provided to processing units of general-purpose computers, specialized computers, or other programmable data processing devices to produce a machine that, when executed through processing units of computers or other programmable data processing devices, generates an apparatus that implements the functions/actions specified in one or more boxes in the flowchart and/or block diagram. These computer readable program instructions may also be stored in a computer readable storage medium, which enables the computer, programmable data processing devices, and/or other devices to work in a specific manner. Therefore, the computer readable medium containing the instructions includes a manufacturing product, which includes instructions for implementing various aspects of the functions/actions specified in one or more boxes in the flowchart and/or block diagram.

Computer readable program instructions may be loaded onto a computer, other programmable data processing apparatus, or other device to perform a series of operational steps on the computer, the other programmable data processing apparatus, or the other device, in order to generate a computer implementation process, thereby enabling the instructions executed on the computer, the other programmable data processing apparatus the other device to implement the functions/actions specified in one or more boxes in the flowchart and/or block diagram.

The flowchart and block diagram in the attached drawings show the possible architecture, functions, and operations of the systems, methods, and computer program products implemented in accordance with the present disclosure. At this point, each box in a flowchart or block diagram can represent a portion of a module, program segment, or instruction, which contains one or more executable instructions used to implement a specified logical function. In some alternative implementations, the functions indicated in the box can also occur in a different order than those indicated in the accompanying drawings. For example, two consecutive boxes can actually be executed in parallel, and sometimes they can also be executed in the opposite order, depending on the function involved. It should also be noted that each box in the block diagram and/or flowchart, and the combination of boxes in the block diagram and/or flowchart, may be implemented using dedicated hardware based systems that perform specified functions or actions, or may be implemented using a combination of dedicated hardware and computer instructions.

The above has already described the various implementations of the present disclosure, and the above explanation is exemplary, not exhaustive, and is not limited to the disclosed implementations. Many modifications and changes are apparent to ordinary technical personnel in the field without deviating from the scope and spirit of the explained implementations. The selection of terms used in this article aims to best explain the principles, practical applications, or improvements to technology in the market of each implementation, or to enable other ordinary technical personnel in the art to understand the various implementations of the present disclosure.

We claim:
1. A method of information processing, comprising:
   executing, by at least one processor of a first computing device, a keyword extraction algorithm to process digital text data comprising an unstructured text set for a target object to extract a plurality of keywords from the unstructured text set;
   executing, by the at least one processor, a clustering algorithm to generate a word vector representing semantics for each keyword of at least a portion of the plurality of keywords and group each keyword of the at least the portion of the plurality of keywords into a group based on semantic similarity;

determining, by the at least one processor, a target factor corresponding to one of the groups of keywords based on a result of the grouping, the target factor representing an aspect of the target object; and generating, by the at least one processor, an information collection form based on the target factor, the information collection form being configured to collect information about the target object, wherein extracting the plurality of keywords comprises:
extracting a candidate word from text in the text set; and in accordance with a determination that the number of occurrences of the candidate word in the text set exceeds a threshold number, determining the candidate word as one of the plurality of keywords.

2. The method according to claim 1, further comprising:
determining at least one target sentence related to the target factor based on the text set, the at least one target sentence reflecting a perspective about the target factor.

3. The method according to claim 2, wherein the determining the at least one target sentence comprises:
extracting, from the text set, at least one candidate sentence containing at least one keyword in the group of keywords; and
determining the at least one target sentence based on the at least one candidate sentence.

4. The method according to claim 2, wherein the at least one target sentence comprises at least one of:
a sentence that reflects a positive perspective on the target factor; and
a sentence that reflects a negative perspective on the target factor.

5. The method according to claim 1, wherein the determining the target factor comprises:
determining whether the group of keywords are similar to a structured factor of the target object in terms of semantics; and
in accordance with a determination that the group of keywords are not similar to the structured factor in terms of semantics, determining the target factor based on the group of keywords.

6. The method according to claim 1, further comprising:
determining a metric for the target factor based on the group of keywords and text in the text set, the metric representing a degree of attention to the target factor.

7. The method according to claim 6, wherein the determining the metric comprises at least one of:
determining the number of occurrences of the group of keywords in the text; and
determining a sentiment level of a sentence in the text, wherein the sentence in the text comprises a keyword in the group of keywords.

8. The method according to claim 1, wherein the grouping at least a portion of the plurality of keywords comprises:
clustering the plurality of keywords to determine a plurality of clusters each comprising at least one keyword;
determining respective qualities of the plurality of clusters, a quality representing an aggregation degree in terms of semantics of keywords in the respective cluster;
removing, from the plurality of keywords, keywords in a cluster with the quality lower than a threshold quality to determine remaining keywords; and
grouping the remaining keywords based on semantics of the remaining keywords.

9. An electronic device, comprising:
at least one processing circuit configured to:
execute a keyword extraction algorithm to process digital text data comprising an unstructured text set for a target object to extract a plurality of keywords from the unstructured text set;
execute a clustering algorithm to generate a word vector representing semantics for each keyword of at least a portion of the plurality of keywords and group each keyword of the at least the portion of the plurality of keywords into a group based on semantic similarity;
determine a target factor corresponding to one of the groups of keywords based on a result of the grouping, the target factor representing an aspect of the target object; and
generate an information collection form based on the target factor, the information collection form being configured to collect information about the target object;
wherein extracting the plurality of keywords comprises:
extracting a candidate word from text in the unstructured text set; and
in accordance with a determination that the number of occurrences of the candidate word in the unstructured text set exceeds a threshold number, determine the candidate word as one of the plurality of keywords.

10. The device according to claim 9, wherein the at least one processing circuit is further configured to:
determine at least one target sentence related to the target factor based on the text set, the at least one target sentence reflecting a perspective about the target factor.

11. The device according to claim 10, wherein at least one processing circuit is configured to:
extract, from the text set, at least one candidate sentence containing at least one keyword in the group of keywords; and
determine the at least one target sentence based on the at least one candidate sentence.

12. The device according to claim 10, wherein the at least one target sentence comprises at least one of:
a sentence that reflects a positive perspective on the target factor; and
a sentence that reflects a negative perspective on the target factor.

13. The device according to claim 9, wherein the at least one processing circuit is configured to:
determine whether the group of keywords are similar to a structured factor of the target object in terms of semantics; and
in accordance with a determination that the group of keywords are not similar to the structured factor in terms of semantics, determine the target factor based on the group of keywords.

14. The device according to claim 9, wherein the at least one processing circuit is further configured to:
determine a metric for the target factor based on the group of keywords and text in the text set, the metric representing a degree of attention to the target factor.

15. The device according to claim 14, wherein the at least one processing circuit is configured to perform at least one of:
determine the number of occurrences of the group of keywords in the text; and
determine a sentiment level of a sentence in the text, wherein the sentence in the text comprises a keyword in the group of keywords.

16. The device according to claim 9, wherein the at least one processing circuit is configured to:
- cluster the plurality of keywords to determine a plurality of clusters each comprising at least one keyword;
- determine respective qualities of the plurality of clusters, a quality representing an aggregation degree in terms of semantics of keywords in the respective cluster;
- remove, from the plurality of keywords, keywords in a cluster with the quality lower than a threshold quality to determine remaining keywords; and
- group the remaining keywords based on semantics of the remaining keywords.

17. A non-transitory computer-readable storage medium comprising computer programs stored thereon, the computer programs executable by a processor to implement a method of information processing, the method comprising:
- executing, by the processor, a keyword extraction algorithm to process digital text data comprising an unstructured text set for a target object to extract a plurality of keywords from the unstructured text set;
- executing, by the processor, a clustering algorithm to generate a word vector representing semantics for each keyword of at least a portion of the plurality of keywords and group each keyword of the at least the portion of the plurality of keywords into a group based on semantic similarity; and
- determining, by the processor, a target factor corresponding to one of the groups of keywords based on a result of the grouping, the target factor representing an aspect of the target object; and
- generating, by the processor, an information collection form based on the target factor, the information collection form being configured to collect information about the target object,
- wherein extracting the plurality of keywords comprises:
  - extracting a candidate word from text in the text set; and
  - in accordance with a determination that the number of occurrences of the candidate word in the text set exceeds a threshold number, determining the candidate word as one of the plurality of keywords.

18. The non-transitory computer-readable storage medium according to claim 17, wherein the method further comprises:
- determining at least one target sentence related to the target factor based on the text set, the at least one target sentence reflecting a perspective about the target factor.

* * * * *